United States Patent [19]
Marantette

[11] Patent Number: 5,145,298
[45] Date of Patent: Sep. 8, 1992

[54] HIGH SPEED DRILL SPINDLE

[75] Inventor: William F. Marantette, Torrance, Calif.

[73] Assignee: Optima Industries, Inc., Torrance, Calif.

[21] Appl. No.: 405,128

[22] Filed: Sep. 11, 1989

[51] Int. Cl.$^5$ .............................................. B23B 19/02
[52] U.S. Cl. ..................................... 409/135; 409/232;
279/51; 310/54; 310/90; 384/99; 384/125;
384/246; 384/388; 384/247; 408/124
[58] Field of Search ............... 409/231, 232, 135, 233;
384/99, 125, 246, 316, 398, 448, 247, 252, 261,
268, 624; 310/54, 90; 279/51; 408/124;
364/172, 175

[56] References Cited

U.S. PATENT DOCUMENTS

| | | | |
|---|---|---|---|
| 3,195,466 | 7/1965 | Young | 310/90 |
| 3,211,060 | 10/1965 | McCann | 409/231 |
| 3,948,577 | 4/1976 | Gamet | 384/99 |
| 4,114,058 | 9/1978 | Albaric | 310/54 |
| 4,496,862 | 1/1985 | Weber | 310/54 |
| 4,534,686 | 8/1985 | Nakamura et al. | 409/135 |
| 4,676,667 | 6/1987 | Komatsu et al. | 384/99 |
| 4,762,447 | 8/1988 | Marantette | 279/51 X |
| 4,869,626 | 9/1989 | Kosmowski | 408/124 X |

FOREIGN PATENT DOCUMENTS

| | | | |
|---|---|---|---|
| 196319 | 11/1983 | Japan | 384/99 |
| 3910574 | 7/1990 | U.S.S.R. | 384/748 |

Primary Examiner—Larry I. Schwartz
Assistant Examiner—Robert Schultz
Attorney, Agent, or Firm—Richard F. Carr; Richard L. Gausewitz; Allan Rothenberg

[57] ABSTRACT

A high speed spindle is provided which includes a rotor driven by an electric motor and provided with tapered journals received in tapered rubber bearings. Lubricating water flows to the bearings through metered openings in the journals, flowing from the openings through reverse spiral grooves in the journals which have diminishing cross section. The water flowing through the rotor also cools the rotor, as well as the collet driven by the rotor and a tool held by the collet. Rubber seals around the rotor shaft wear to a zero clearance during run-in for confining the water that exhausts from the bearings. Compressed air is introduced into the spindle to cooperate with the seals in preventing water leakage. The compressed air also reacts against a bladder that is arranged to impose an end load on one of the bearings, which is movable, to urge the bearing toward its journal. The force is varied to increase the bearing end load as rotor speed increases. The collet employs self-holding tapers to retain it in a closed position and has cam surfaces to help open it to the released position. The collet is retained by a removable member so that the collet can be removed and a broken tool shank extracted.

53 Claims, 9 Drawing Sheets

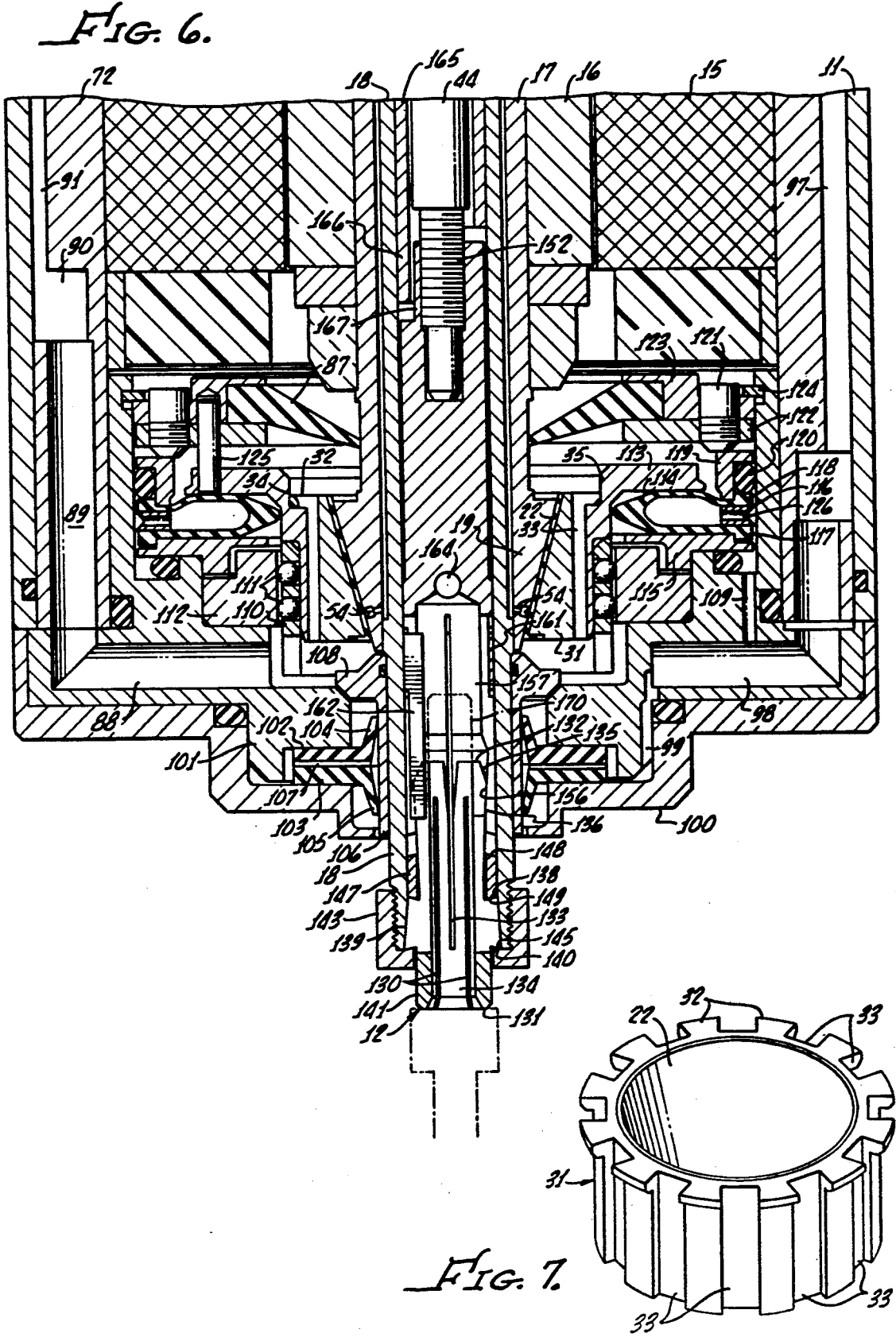

HIGH SPEED DRILL SPINDLE

BACKGROUND OF THE INVENTION

In the preparation of printed circuit boards, it may be necessary to drill many openings which must be precisely located and have accurate dimensions. Tests have shown that the spindle must rotate at high rpm if good hole quality is to be achieved. The higher the rotational speeds, the better accuracy of the drilling and the longer the life of the drills. Conventional spindles are not capable of achieving optimum rotational velocity. A drilling spindle with conventional ball bearings is severely limited in the rotational speeds it can achieve. Spindles have been devised with air bearings, which allow higher speeds. Nevertheless, speeds beyond their capability—generally around 100,000 rpm—are desirable.

An additional serious difficulty has been encountered with spindles having air bearings. These spindles are delicate and generally cannot withstand forces other than those incurred during an ideal drilling operation. Other loads, such as impacts which may result from an operator error, cause metal-to-metal contact at the air bearings and instant destruction of the spindle. Such occurrences are widespread.

Heat is another enemy of hole quality and also of drill life. With prior art spindles, the drills not only become heated from friction while drilling the holes, but also receive heat from the spindle. Although the stator of the spindle drive motor may be cooled by an external water jacket, there has been no provision to cool the rotor, which increases in temperature as the spindle is operated. Heat from the rotor then becomes transmitted through the collet to the drill. This heat also results in dimensional growth of the rotor and results in electrical losses.

Spindles having tapered rubber bearings using water as a lubricant are capable of relatively high rotational velocities and are more durable than those with air bearings. Such bearings are disclosed in U.S. Pat. Nos. 3,929,393 and 4,229,139. However, these bearings as constructed and arranged in the past have not permitted a spindle to rotate as fast as desired. At very high rotational speeds, it is not possible to maintain a water film between the journal and the bearing surface in prior water bearing designs As water is introduced through the bearing, centrifugal force generated by the high speed rotation drives the water out of the bearing.

In U S. Pat. No. 3,929,393 one of the bearings is movable and is spring loaded to compensate for dimensional changes brought about by water absorption, wear and temperature changes. However, this construction will not function in a spindle that rotates at very high speeds. The end load on the bearing will be excessive at start-up and during low speed operation if the end load is to be adequate for high speed rotation. Too much end load will prevent the creation of a lubricating water film and can result in friction of a magnitude that will prevent the spindle motor from starting. A smaller end load, on the other hand, results in excessive vibration as speeds increase and will prevent high rotational velocities from being achieved.

Spindles for printed circuit board drilling machines are provided with automatically operated collets which function with tool changers to enable different sizes of drills to be operated during a drilling program. An improved collet for holding the drill bit is disclosed in U.S. Pat. No. 4,762,447 which employs self-holding tapers to retain the collet in the closed position gripping the drill shank. This avoids the need for springs or some other means for maintaining the collet in the closed position as the drilling operation proceeds. This collet suffers from a problem, however, in the event that the drill bit breaks off flush with the bottom end of the collet. There is then no way of gripping the stub end of the drill to pull it from the collet. Also, the collet cannot then be removed from the shaft of the rotor without a major disassembly. Consequently, dismantling of the spindle becomes necessary for removing a broken drill bit under those circumstances

BRIEF SUMMARY OF THE INVENTION

The present invention provides a spindle for drilling or operating other rotary tools overcoming the problems of the prior art, enabling greatly increased rotational speeds to be achieved with improved cooling, bearing life and drill bit life. Also, the collet is arranged for positive opening and enables broken drills to be removed without difficulty.

The spindle of this invention utilizes water bearings with an improved system for distributing the lubricating water, as well as a means for imposing a programmed axial load on the bearings to achieve optimum bearing stiffness at different rotational velocities. Water for lubrication is conducted through the rotor to the interior of the bearings, rather than from the exterior as in conventional designs The water is conducted to the bearing surfaces by metering passageway in the journals so that centrifugal force does not drive the lubricant away from the bearing surfaces, but instead assists in causing the water to flow through the bearings. The bearings and journals are tapered. In order to distribute the water over the full surface of the bearings, spiral grooves are cut in the journals, extending from the water outlet openings in a direction away from the direction of rotation of the rotor. Therefore, as the journal turns within the bearing, the water readily flows down the grooves, which are of a progressively decreasing cross section, to be distributed across the bearing surface.

The flow of water through the rotor has the added advantage of cooling the rotor so that it is of constant dimension and will not grow from an increase in temperature. Electrical losses in the motor are minimized. Instead of conducting heat to the drill held in the collet, the cooled rotor withdraws heat from the drill. This flow of heat from the drill through the collet to the rotor makes the drill run cooler to result in improved hole dimensions and increased drill life.

Compressed air is supplied to the interior of the spindle and cooperates with special seals to keep the lubricating water in the proper path. These seals are of silicone rubber with tips which engage the shaft with a slight interference fit upon initial assembly. The seals wear to a zero clearance during a run-in period. Conventional seals would wear too rapidly and would cause too much frictional drag on the rotor.

A bearing pre-load system is provided which controls the stiffness of the bearings in accordance with the speed of rotation. One of the bearings is fixed, but the other is movable. Therefore, a force applied to the latter bearing adjusts the force applied to both. The bearing end loading is accomplished by an air bladder which receives compressed air as the spindle operates for controlling the axial load on of the movable bearing. A pressure sensor produces a signal representative of the pressure within the bladder. This signal is compared with a signal that corresponds to the speed of the rotor. The result is an error signal used in operating a valve which controls the pressure to the bladder. In this manner, a desired pattern of bearing end load is attained increasing the end load in a predetermined manner as rotor speed increases The collet incorporated in the spindle of this invention makes use of self-holding tapers but also includes provision for extending the collet beyond the shaft a distance sufficient to permit its removal from the shaft. It then is possible to extract a broken drill bit without difficulty and without any other disassembly. To accomplish this, the operation of the collet is reversed from that of U. S. patent No. 4,762,447, with the collet being caused to close from upward movement of a wedge member and to open from downward movement. Extension of the collet is possible by removing a stop from the lower end of the shaft and pushing downwardly on the wedge member to expose the necessary length of the collet.

BRIEF DESCRIPTION OF THE DRAWINGS

FIG. 6 is an enlarged longitudinal sectional view of the lower portion of the spindle;

FIG. 7 is a perspective view of the lower bearing and bearing block removed from the other components of the spindle;

FIG. 8 is a fragmentary perspective view of the two journals of the rotor;

In FIGS. 2, 5, 6, 15 and 16 some of the components are shown rotationally out of their actual positions for clarity.

DETAILED DESCRIPTION OF THE INVENTION

Figure 1:
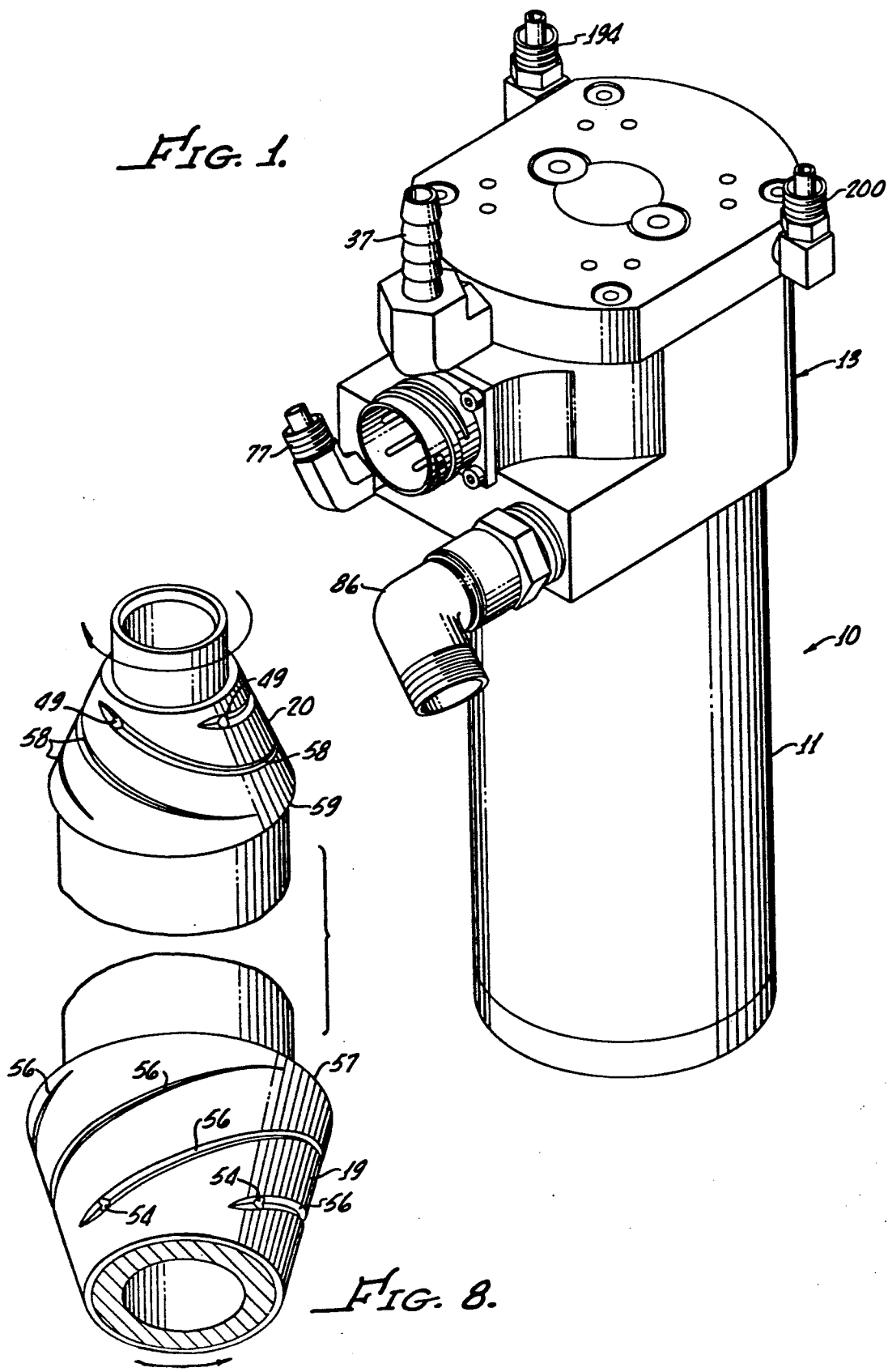
FIG. 1 is a perspective view of the spindle of this invention.

The spindle 10 of this invention, as seen in FIG. 1, includes a cylindrical casing 11 which houses the electric motor that drives the collet 12 which projects from the lower end o the casing. The housing 13 at the upper end of the casing 11 contains the mechanism for actuating the collet 12, as well as the inlet and outlet connections for air and water, as will be explained below. The casing 11 normally is mounted in air bearings on a drilling machine and reciprocated vertically during drilling operations.

Figure 2:
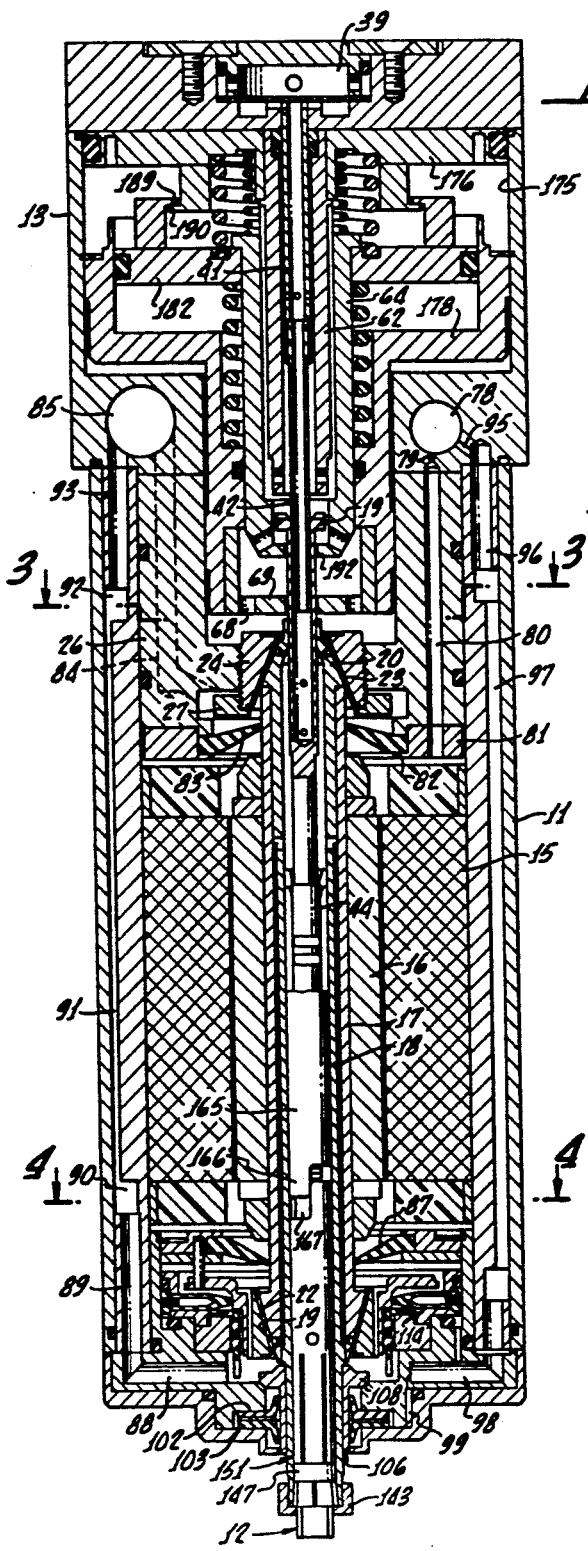
FIG. 2 is a longitudinal sectional view of the spindle.
Figure 3:
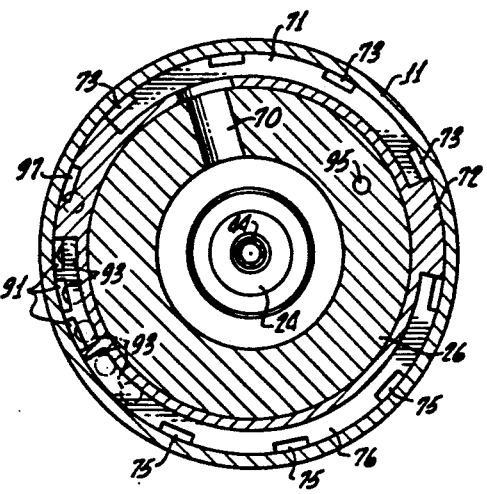
FIG. 3 is a transverse sectional view taken on line 3—3 of FIG. 2.
Figure 4:
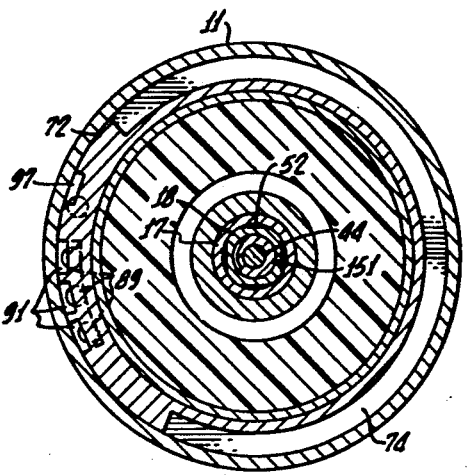
FIG. 4 is a transverse sectional view taken along line 4—4 of FIG. 2.

Within the casing 11 the squirrel cage electric motor, as shown in FIGS. 2-4, includes a stator 15 within which is an armature 16. The rotor shaft includes a tubular member 17 that fits within the armature 16 and extends beyond either end of it. A second tubular shaft member 18 is within the tubular shaft member 17 and also extends beyond either end of the armature 16. The shaft members 17 and 18 are bonded to each other and to the armature so that these parts rotate together. The lower end portion 19 of the shaft 17 is frustoconical and the upper end portion 20 of the shaft 18 has a similar contour. The frustoconical parts 19 and 20 form the journals for the rotor 16. A rubber bearing 22 receives the journal 19 at the lower end part of the spindle and a rubber bearing 23 receives the journal 20 above the armature 16. These tapered bearings absorb both axial and radial loads. Preferably, the bearings 22 and 23 are of Viton rubber because of its durability, and are lubricated by water, as described below.

Figure 5:
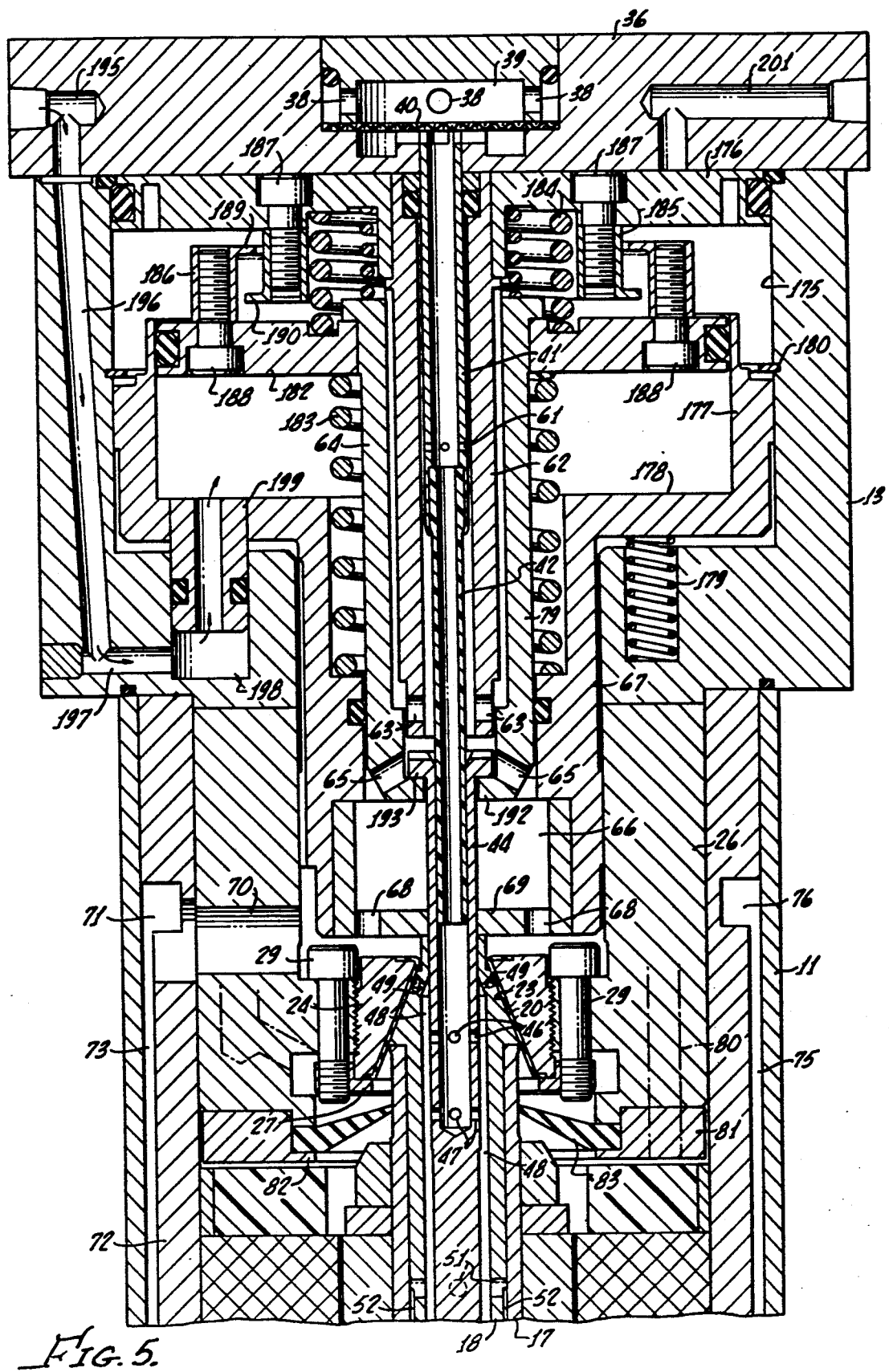
FIG. 5 is an enlarged fragmentary longitudinal sectional view of the upper portion of the spindle.

The upper bearing 23, as seen in FIG. 5, is molded on a block 24 which has a frustoconical inner surface at the same angle as that of the journal 20. The bearings are thin, typically 0.015 inch thick so as to be as stiff as possible while maintaining an uninterrupted rubber surface. The bearing block 24 has threads on its outer periphery which mesh with threads in an opening in a stationary member 26 within the casing 11. The bottom edge of the bearing support block 24 engages a ring 27 which is L-shaped in cross section and acts as a stop. Two screws 29 extend through openings in the stationary member 26 and are received in threaded openings in the ring 27. This supports the ring 27. Rotation of the screws 29 will vary the position of the ring 27 axially which allows axial adjustment of the bearing support 24 and with it the bearing 23 relative to the stationary member 26. Once set, the position of the upper bearing 23 remains fixed.

The lower bearing 22, as illustrated in FIG. 6, is molded onto a bearing block 31 which has an outwardly facing annular flange 32 at its upper end. A plurality of slots 33 (see FIG. 7) extend from one end of the bearing block 31 to the other around its outer periphery The flange 32 engages a shoulder 34 on an annular member 35, which is bonded to and supports the lower bearing block 31.

Water for lubricating the bearings 22 and 23, as well as for cooling the spindle, enters the end cap 36 of the upper housing 13 through a fitting 37 (FIG. 1). This water is transmitted through a port 38 into a chamber 39 within which is a filter screen 40, shown in FIG. 5.

After passing through the screen 40, the water enters a supply tube 41 which discharges into a plastic tubular water injection needle 42. The lower end of the latter member empties into the tubular upper end of a drawbar 44 which is used in actuating the collet, as explained below. The drawbar 44 rotates with the armature 16 while the injection needle 42 is stationary.

Discharge openings 46 and 47 in the drawbar 44 empty water into an annular space 48 between the exterior of the drawbar and the interior of the shaft member 18. Four equally spaced metering orifices 49 extend through the wall of the journal 20 adjacent its apical end, communicating with the space 48. Therefore, lubricating water can be conducted through the openings 49 to the interior of the bearing 23.

Another portion of the water from the space 48 flows outwardly through four radial openings 51 through the wall of the shaft 18, which are spaced below the openings 46 and 47. The openings 51 communicate with narrow passageways defined by four flats 52 extending downwardly from the openings 51 along the periphery of the shaft 18. Consequently, water flows downwardly between the shaft members 17 and 18 to the vicinity of the lower bearing 22. At the latter location (see FIG. 6) there are four metering orifices 54 adjacent the apical portion of the journal 19. This allows water to flow to the bearing 22 to provide lubrication.

Significant advantages are realized by bringing the water for lubricating the bearings 22 and 23 from within the rotor. One of these results from centrifugal force which helps to cause the water to flow outwardly to the bearings to assure a proper supply. This is important at the high speeds, such as 120,000 rpm, at which this spindle is designed to rotate. If an attempt is made to bring water to the bearings from the outside, centrifugal force generated at these rotational speeds will drive the water away from the bearing surfaces so that they will be dry and cannot function The lubrication of the bearings is enhanced by the inclusion of spiral grooves in the journal surfaces, as illustrated in FIG. 8. Formed in the journal 19 are four spiral grooves 56, one extending from each of the openings 54. The rotation of the journal 19, as shown in FIG. 8, is counterclockwise. The grooves 56 have short segments forwardly of the openings 54, with the principal portions of these grooves extending rearwardly from the openings 54 in a clockwise direction This means that the rotation of the journal 19 in the bearing 20 tends to cause the water to flow down each of the grooves 56 so that it can be distributed along the full journal surface. Each of the grooves 56 extends for approximately 180°. They are made so that they become increasingly more shallow toward their outer ends as they spiral toward the larger end 57 of the journal surface 19. This diminution of cross-sectional area of the grooves helps force the water outwardly for lubricating along the surface of the journal 19.

The other journal 20 is grooved in a similar manner. Four spiral grooves 58 extend rearwardly from the four openings 49. These grooves also include short segments forwardly of the openings 49, but their principal portions extend down the journal surfaces away from the direction of rotation The grooves 58 are similar to the grooves 56, extending for approximately 180° and toward the larger end 59 of the journal 20. As for the grooves 56, the grooves 58 diminish in cross section as they approach their outer ends.

The spiral grooves in the journal surfaces 19 and 20 reduce the turbulence of the water and the velocity of the water flowing through the bearings Water friction also is diminished, as a result of which the resistance to rotation is reduced. A very efficient bearing arrangement results.

Another major advantage from the flow of water through the rotor is the cooling of this region of the spindle which results. There is no significant growth of the rotor from heat build-up, unlike ordinary spindles. Instead of transmitting heat outwardly through the collet to the drill being operated, as in conventional designs, the rotor acts as a heat sink to receive heat from the drill via the collet. As a result, improved hole quality is obtained from the drill and the life of the drill is extended.

An additional quantity of water exits the supply tube 41 through radial openings 61 and flows downwardly around the water injection needle 42. This water is confined within a sleeve 62 that extends around and is spaced from the supply tube 41 and the needle 42. The sleeve 62 is part of the mechanism for actuating the collet, as explained below. The water then flows outwardly through openings 63 at the lower end of the sleeve 62 into the interior of a larger sleeve 64 that also functions to actuate the collet.

Figure 9:
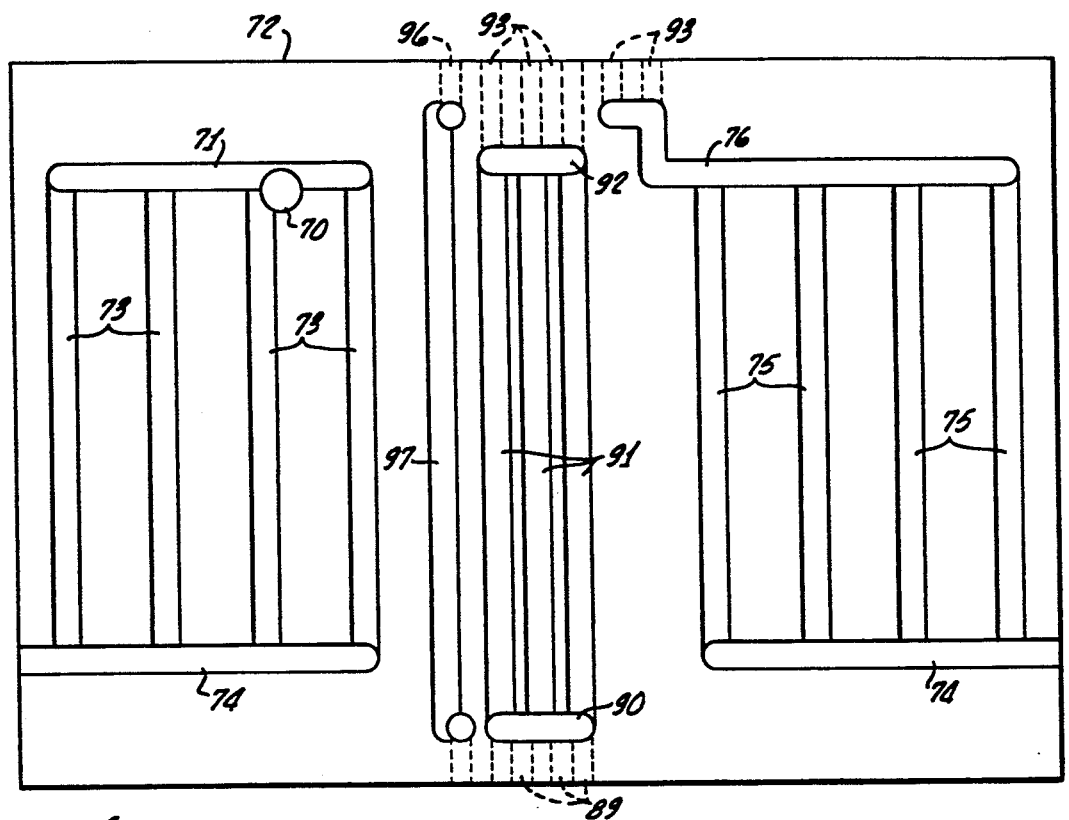
FIG. 9 is a flat pattern development of the jacket that surrounds the stator.
Figure 10:
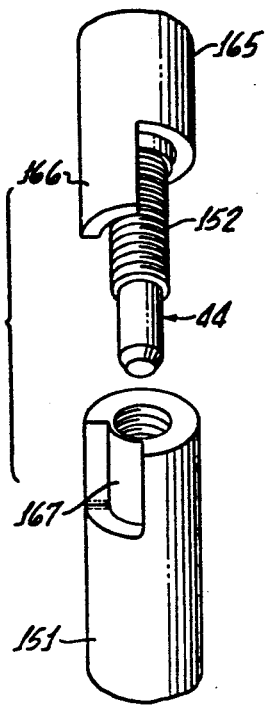
FIG. 10 is an enlarged fragmentary perspective view showing the arrangement for coupling the collet assembly to the rotor.

The water then flows out of openings 65 at the lower end of the sleeve 64 into a chamber 66 at the lower end of a tubular member 67 that is another part of the mechanism for actuating the collet. From there the water is conducted through openings 68 in a hardened steel disc 69 at the lower end of the tubular member 67, and into a port 70 through the member 26 which connects to a passageway 71. The latter passageway extends partway around the circumference of a jacket 72 that fits closely within the casing 11. The passageway 71 acts as a manifold to distribute water to axial grooves 73 in the jacket 72, as seen in FIG. 9, which is a flat pattern development of the jacket The opposite ends of the grooves 73 connect to a circumferentially extending manifold groove 74 near the lower end of the jacket 72. Four axial grooves 75 connect the manifold 74 to an upper circumferential groove and exhaust port 76.

The flow of water through the grooves 72, 73, 74 and 75 cools the stator. The supply of cooling water is supplemented by water that leaks from between the supply needle 42 and the drawbar 44, and by water discharging from the upper end of the bearing 23.

Compressed air is introduced into the spindle 10 and used to keep the water from flowing into undesired locations, as well as to control bearing stiffness. This air enters through a fitting 77 that connects to the upper end housing 13. From the fitting 77 the air flows into a port 78 in the lower part of the housing 13, as seen in FIG. 2. A portion of this compressed air flows downwardly through a metering orifice 79 into a passageway 80 that extends through the member 26 and continues on through an opening in a ring 81, emptying into the space beneath the ring. The ring 81, as best seen in FIG. 5, includes an annular flange 82 along its inner periphery that supports the outer edge of a seal 83. The upper part of the outer edge of the seal is retained by the member 26. The seal 83 is annular and frustoconical, tapering in thickness to its thin inner edge which extends around the periphery of the shaft 17 of the rotor.

The seal 83 is of silicone rubber and makes a slight interference fit with the shaft 17 when the spindle is first assembled. During a low speed break-in period, the inner edge of the seal wears rapidly so that ultimately it has substantially zero clearance at the shaft 17. The seal 83 functions to retain the water which exhausts from the lower end of the bearing 23. The compressed air beneath the seal 83, however, is necessary to provide an air curtain that precludes all leakage of water downwardly around the exterior of the rotor. Some of the air flows upwardly past the inner edge of the seal 83, mixing with the water that exhausts from the lower end of the bearing 23 and flowing outwardly through a port 84 to an exhaust passageway 85 in the upper housing 13. A fitting 86 connects to the passageway 85 in the upper housing 13 to exhaust the air and water from the spindle.

Some of the compressed air beneath the seal 83 flows downwardly through the annular space between the stator 15 and the armature 16. At the bottom of the spindle this air reaches an annular seal 87 which is similar to the seal 83. Thus, the seal 87 is of silicone rubber of frustoconical shape and tapers in thickness to its inner edge adjacent the rotor shaft 17. The seal 87 is made to have a slight interference fit with member 17 when initially installed and wears to a zero clearance during the break-in period The air at the seal 87 prevents the water exhausting from the upper end of the bearing 22 from flowing upwardly into the vicinity of the electric motor that drives the spindle. Some of the air leaks past the seal 87 at the shaft 17 of the rotor and then flows downwardly through the slots 33 in the periphery of the bearing support block 31. The water exhausting from the upper end of the bearing 22 also flows downwardly with the air through the slots 33. At the bottom of the bearing block 31, the pressure of the air causes the water to flow into a radial port 88 and from there into axial openings 89 in the jacket 72 which lead to a manifold groove 90. Axial grooves 91 in the jacket 72 connect to an upper manifold groove 92 in the jacket which, through openings 93, conducts air and water to the exhaust passageway 85 in the upper housing 13.

Some of the air from the inlet port 78 flows through a metering passageway 95 to a passageway 96 which leads to a passageway 97 formed as a slot in the periphery of the jacket 72. At the bottom of the spindle this air enters a radial passageway 98 which, at its inner end, connects to a vertical metering passageway 99. This passageway connects to the interior of the lower end cap 100 of the spindle The lower end of an annular member 101 extends into the lower end cap 100 and cooperates with the lower end cap to hold two seals 102 and 103. These seals are L-shaped in cross section and include end flanges 104 and 105 which are at obtuse angles relative to the principal portions of the seals. The upper end flange 104 inclines upwardly toward the rotor and the lower end flange 105 inclines downwardly toward the collet. The tips of the end flanges 104 and 105 are adjacent a sleeve 106 which fits over and rotates with the shaft 18 of the rotor. The seals 102 and 103 are made of silicone rubber and their tips initially form an interference fit with the sleeve 106. As for the seals 83 and 87, the seals 102 and 103 wear to a zero clearance around the sleeve 106 during break-in.

The air from the passageway 99 flows radially toward the axis of the spindle through slots 107 formed in the mating flat surfaces of the seals 102 and 103. It then enters the space between the end flanges 104 and 105 of the two seals 102 and 103, and the sleeve 106. A portion of this air leaks past the upper edge of the end flange 104 of the seal 102 and maintains a pressure which prevents water from flowing downwardly out of the spindle. The remainder of the air between the seals flows downwardly past the tip of the end flange 105 of the seal 103 and out through the gap between the end cap 100 and the sleeve 106, preventing dirt an other foreign matter from entering the spindle.

Air discharging past the flange 104 of the seal 102 flows through a gap between a flange 108 at the top of the sleeve 106 and the member 101. There the air joins the water exhausting from the lower bearing 22 to flow into the passageway 88 and from there to the exhaust. The water from the lower end of the bearing 22 comes into contact with the rotating flange 108, which drives it outwardly by centrifugal force and dissipates some of its energy.

Part of the air from the radial passageway 98 at the bottom end of the spindle flows upwardly through a passageway 109 defined by a notch in the outer periphery of the member 101. This air performs an important function in controlling the end load on the bearings 22 and 23.

Outside of the member 35 which supports the lower bearing block 31 is a bearing retainer ring 110, having openings through its wall which receive two sets of bearing balls 111. These balls are confined with a slight press fit between the circumferential wall of the member 35 and a fixed annular ring 112 supported by the member 101. As a result, a linear bearing is provided so that it is possible to move the member 35, and with it the bearing block 31, in an axial direction, while radial movement is precluded.

A radial flange 113 projects outwardly form the upper end of the member 35 and extends over a rubber bladder 114. A ring 115 with a flat upper surface is beneath the bladder 114. The ring 115 rests upon an annular flange formed in the member 101 and is fixed. The bladder 114 is annular and has an open outer edge. Within this edge is a flat ring 116 which has a concave outer circumferential edge. The outer periphery of the bladder 114 is pressed against he ring 116 to form a seal so that the bladder defines an enclosed chamber. A bead 117 on the lower outer edge of the bladder 114 fits within a notch in the outer periphery of the fixed ring 115. The upper outer edge of the bladder 114 includes a similar bead 118 which is outside of a ring 119 and beneath an O-ring 120. The bladder is held in place by screws 121 which press downwardly on the ring 119 and force it toward the ring 116. The screws 121 are threaded into openings in a flat washer 122 which is beneath a washer 123, the latter being held against upward movement by a snap ring 124. The screws 121 extend through unthreaded openings in the washer 123. A pin 125 projects upwardly form the flange 112 of the member 35 and fits within complementary openings in the washers 122 and 123. This precludes rotation of the member 35 and hence the bearing block 31 and lower bearing 22.

The washers 122 and 123 hold the seal 87. A notch is provided in the inner periphery of the washer 123 so that the outer portions of the seal 87 fit into this notch and above the washer 122. This retains the seal 87 in a fixed position.

By virtue of of this construction, air can flow upwardly through passageway 109 past the outer edge of the ring 117 and the outer edge of the bladder 114 to the outer concave periphery of the ring 116. Openings 126 extend radially through the ring 116. Therefore, compressed air can enter the chamber defined by the bladder 114.

The end load on the bearings 22 and 23, which can be termed the bearing stiffness, is controlled by varying the pressure within the bladder 114. Increased pressure within the bladder 114, reacting through the member 35 and the bearing support 31, results in a greater end load on the bearing 22, which similarly affects the upper bearing 23. For start-up conditions and when the spindle is rotating at low speeds a relatively low end thrust is required at the bearings. This is to assure a proper lubricating film between the bearing surfaces and the journals Too much bearing end load will result in a high frictional resistance to rotation and can prevent the spindle motor from starting. However, at higher rotational speeds considerably greater bearing stiffness is required and, in fact, the spindle cannot operate with bearing end loads of the magnitude necessary for start-up and low speed operation. Insufficient bearing stiffness will result in excessive vibration and prevent high speed operation, such as up to 120,000 rpm. The bearing stiffness control system is explained below.

The collet 12 fits within the lower end of the shaft member 18 so that it can engage and grip the shank of the drill or other tool that is to be rotated by the spindle. Therefore, the collet 12 is made to be compressible radially, which is accomplished by a plurality of axial slots extending inwardly from either end of the basket This includes four equally spaced slots 130 extending from the lower end 131 of the collet 12 to a location adjacent the upper end 132. Four additional axial slots 133 are intermediate the slots 130 and extend downwardly from the upper end 132 to a location adjacent the lower end 131. The interior surface 134 of the collet 12 is cylindrical.

Exteriorly the collet 12 includes a beveled surface 135 that extends downwardly from the upper end 132 and connects to an exterior surface 136 which has a shallow taper converging downwardly. The angle of the surface 136 is that of a selfholding taper, generally defined as within the range of 2° to 3° or less. The lower end of the tapered surface 136 connects to a shoulder 138 that extends outwardly to another tapered surface 139. The latter surface also has a shallow self-holding taper of the same angle as that of the surface 136, and diverges downwardly. The shoulder 138 also is tapered, inclining downwardly from its juncture with the surface 139 to the connection to the surface 136. This angle is 75° with respect to the axis of the collet. At the lower end of the surface 139 is another shoulder 140 extending inwardly in the radial direction toward the cylindrical surface 141 that extends to the lower end 131 of the collet 12. The shoulder 140 also is at a 75° angle relative to the axis of the collet and it is inclined upwardly and inwardly from its radially outer edge.

The lower internal surface 142 of the shaft 18 flares outwardly at a taper matching that of the collet surface 139, which is adjacent to it.

The collet 12 is held within the shaft member 18, with only its lower end part projecting from it, by means of a nut 143 which threads onto the lower end of the shaft. The nut 143 includes a radially inwardly extending flange 144 which includes an upwardly facing shoulder 145, adjacent the shoulder 140 of the collet 12. The shoulder 145 has a taper matching that of the surface 140.

Above the shoulder 138 of the collet 12 is a ring 147 which has tapered upper and lower end edges 148 and 149, respectively, which converge outwardly. The edge 149 is adjacent the shoulder 138 and has a taper corresponding to that of the shoulder 138. The upper end edge 148 has a taper the same as that of the end edge 149, but extending in the opposite direction.

A wedge member 151 extends up into the shaft 18 above the collet 12. The upper end of the wedge member 151 is formed as a cylindrical rod having a threaded opening extending inwardly from its upper end receiving the threaded lower end part 152 of the drawbar 44.

Below its upper end portion, the wedge member 151 is hollow and is provided with six axial slots 154 extending upwardly from its lower end 155. Consequently, the wedge member 151 at its lower end portion is radially compressible. The bottom end edge 155 of the wedge member 151 tapers in the same way as the upper end edge 148 of the ring 147, that is, at an angle of 75° relative to the axis of the spindle Extending upwardly from the lower end edge 155 is a tapered interior surface 156 which is adjacent and at the same angle as the exterior surface 136 of the collet 12. In other words, the surface 156 is at an angle corresponding to that of a self-locking taper, which generally is around 2° to 3°. Above the tapered surface 156 the interior wall 157 is cylindrical.

Figure 12:
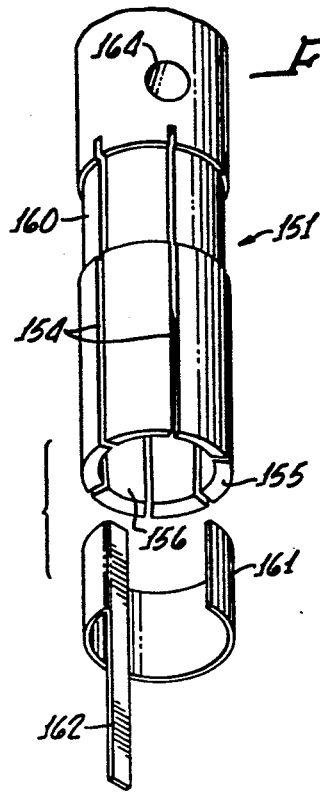
FIG. 12 is an enlarged perspective view of another portion of the collet assembly.
Figure 11:
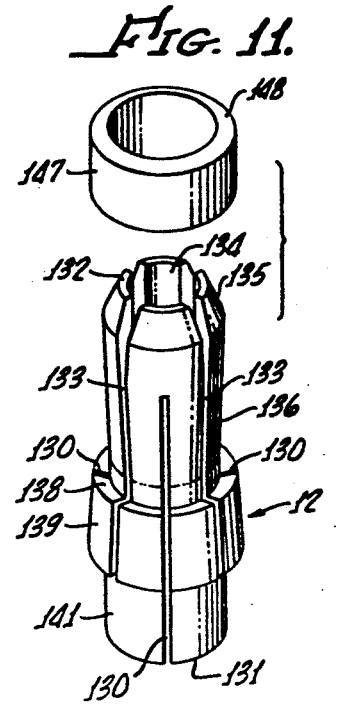
FIG. 11 is an enlarged perspective view of a portion of the collet assembly.

Exteriorly, the lower portion of the wedge member 151 is cylindrical and complementary to the cylindrical interior wall of the shaft member 18. However, there is a shallow annular recess 160 near the upper end of the hollow portion of the wedge member which receives a split ring 161. An elongated radial tab 162, shown separately in FIG. 12, at one end of the split ring 161 extends through a slot 154 of the Wedge 151 and into a slot 133 of the collet 12. This rotationally positions the collet 12 relative to the wedge 151.

The ring 161 with its tab 162 allows the runout of the collet to be minimized by selecting one of the various relative rotational positions permitted between the collet 12 and wedge 151. The collet is inserted into the wedge at different rotational positions permitted by the slots 133 and in each instance the runout is measured The rotational position of the ring 161 on the wedge 151 also may be varied as permitted by the slots 154. The position of minimum runout is selected for operation of the spindle.

A radial opening 164 extends through the wedge member 151 at the upper end of the hollow portion. This permits insertion of a screw driver into the wedge member 151 at its lower end to engage the wall of the opening 164 to rotate the wedge member to permit it to be disconnected from the drawbar 44.

The wedge 151 is coupled to the rotor by a keying arrangement that includes a sleeve 165 in the shaft 18 and rotatable with it. The drawbar 44 extends through the sleeve 165. At its lower end, more than half of the circumference of the sleeve is removed to provide a partial section 166 The upper end of the wedge 151 also has a portion of its circumference removed to result in a recess 167, although the threaded opening for the end of the drawbar remains intact The partial section 166 is fitted into the recess 167 in the assembled spindle so that the wedge 151 becomes coupled to the rotor.

In order to close the collet 12 on the shank 170 of a drill bit, an upward pull is exerted on the drawbar 44, which also pulls upwardly on the wedge member 151. This causes the tapered interior surface 156 of the wedge member to react against the external tapered surface 136 of the collet 12 to compress the collet at its upper end portion and move it upwardly. This occurs because the periphery of the wedge member 151 is confined by the shaft 18. Upward movement of the collet 12 causes the tapered lower interior surface 142 of the shaft member 18 to react against the exterior surface 139 of the collet near its lower end 131 to compress the collet at that location. Therefore, the collet is compressed adjacent its upper end by the wedge member and adjacent its lower end by the shaft. This causes the collet 12 to grip the shank 170 of the drill at two locations.

After the upward pull has been exerted by the drawbar 44 the force is released, but the drill shank 170 remains gripped within the collet. This results because of the self-holding tapers between the collet 12 and the wedge 151, and between the collet 12 and the shaft 18. The components of the collet assembly retain their relative positions because of the angles of these tapers.

Release of the drill shank 170 is accomplished by opposite movement of the drawbar 44 which pushes downwardly on the wedge 151. This will cause both of the tapers to release One may release before the other, but this is inconsequential since both will release from the downward movement of the wedge 151. For example, if this downward movement should first cause the shoulder 140 of the collet 12 to engage the shoulder 145 of the nut 143, the collet 12 will have been shifted downwardly relative to the shaft 18, thereby releasing the wedging effect at the tapered surfaces 139 and 142. With the collet 12 then being stopped in its axial movement, the wedge 151 will move downwardly relative to the collet and release at the tapered surfaces 136 and 156. On the other hand, if the wedge 151 first should move relative to the collet to initially release at the tapered surfaces 136 and 156, the wedge then will engage the end edge 148 of the ring 147 and through it force the collet 12 downwardly to release at the tapered surfaces 139 and 142.

The tapered end of the wedge 151, tapered end edges of the ring 147 and the tapered shoulders of the collet 12 and the nut 143 help cause the release of the collet. As the wedge 151 moves downwardly, the edge surface 148 of the ring 147 cams the lower edge portion of the wedge radially outwardly away from the surface 136 of the collet 12 to help the upper taper release. In addition, the tapered lower edge 149 of the ring 147, engaging the correspondingly tapered shoulder 138 on the collet 12, will provide a force spreading the lower end of the collet outwardly to open the collet 12 and release the drill shank 170. The tapered shoulder 145 of the nut 143 and shoulder 140 of the collet produce a similar effect.

The mechanism for operating the collet is hydraulically actuated and located within the upper housing 13. This housing defines a cylinder 175 at the upper end of which is a piston 176. Also within the cylinder 175 and movable relative to it is a smaller cylinder 177 having a head 178 at its lower end. The cylinder 177 is biased upwardly by a plurality of compression springs 179 that are received in recesses in the transverse lower wall of the housing 13 and engage the head 178. Upward travel of the cylinder 177 is limited by a snap ring 180 in the wall of the cylinder 175. A piston 182 is within the cylinder 177, biased in the upward direction by compression spring 183 that bears also against the cylinder 177. An additional compression spring 184 presses the piston 182 downwardly, bearing at its upper end against the piston 176.

The pistons 176 and 182 carry rings 185 and 186, respectively, on their adjacent faces, held to the pistons by screws 187 and 188. The ring 186 circumscribes the ring 185. The ring 186 has an inwardly extending radial flange 189 at its outer end which overlaps a radial flange 190 projecting outwardly from the end of the ring 185. The flanges 189 and 190 act as stops, limiting the movement of the piston 182 downwardly away from the piston 176.

The tubular member 64 is carried by the piston 182 and extends around but is spaced from the sleeve 62. The lower end of the tubular member 64 extends below the sleeve 62 and around the upper end of the drawbar 44. An inwardly directed radial flange 192 on the lower end of the member 64 is below an outwardly directed slotted radial flange 193 at the upper end of the drawbar 44.

During a drilling operation, which is the position of FIG. 2, the piston 182 is in a downward position with its stop 190 engaging the stop 189 carried by the piston 176. The flange 192 at the end of the sleeve 62 then is spaced from the flange 193 of the drawbar 44. When the collet is to be closed, high pressure water is introduced through a fitting 194 into a port 195, which connects through passageways 196 and 197 that lead to a cylindrical opening 198 in the lower transverse wall of the upper housing 13. A sleeve 199, carried by the head 178 of the cylinder 177, is received in the cylindrical opening 198. Therefore, water is conducted through the sleeve 199 into the cylinder 177 between th cylinder head 178 and the piston 182. The resulting reaction on the cylinder 177 moves it downwardly so that the disc 69 carried at its lower end is brought into engagement with the upper end of the rotor shaft 18.

An equal and opposite reaction moves the piston 182 upwardly, causing the flange 192 of the sleeve 191 to engage the flange 193 of the drawbar 44. This position is shown in FIG. 5. As a result, the drawbar 44 is moved upwardly, closing the collet to lock it against the shank 170 of the drill bit, as described above.

Once this has taken place, the pressure within the cylinder 177 is relieved so that the cylinder 177 and the piston 182, under the bias of the springs 179 and 183, return to their normal positions. That means that the disc 69 no longer engages the rotor shaft 18 and the flange 192 of the sleeve 64 is moved downwardly away from the end flange 193 of the drawbar 44.

Figure 15:
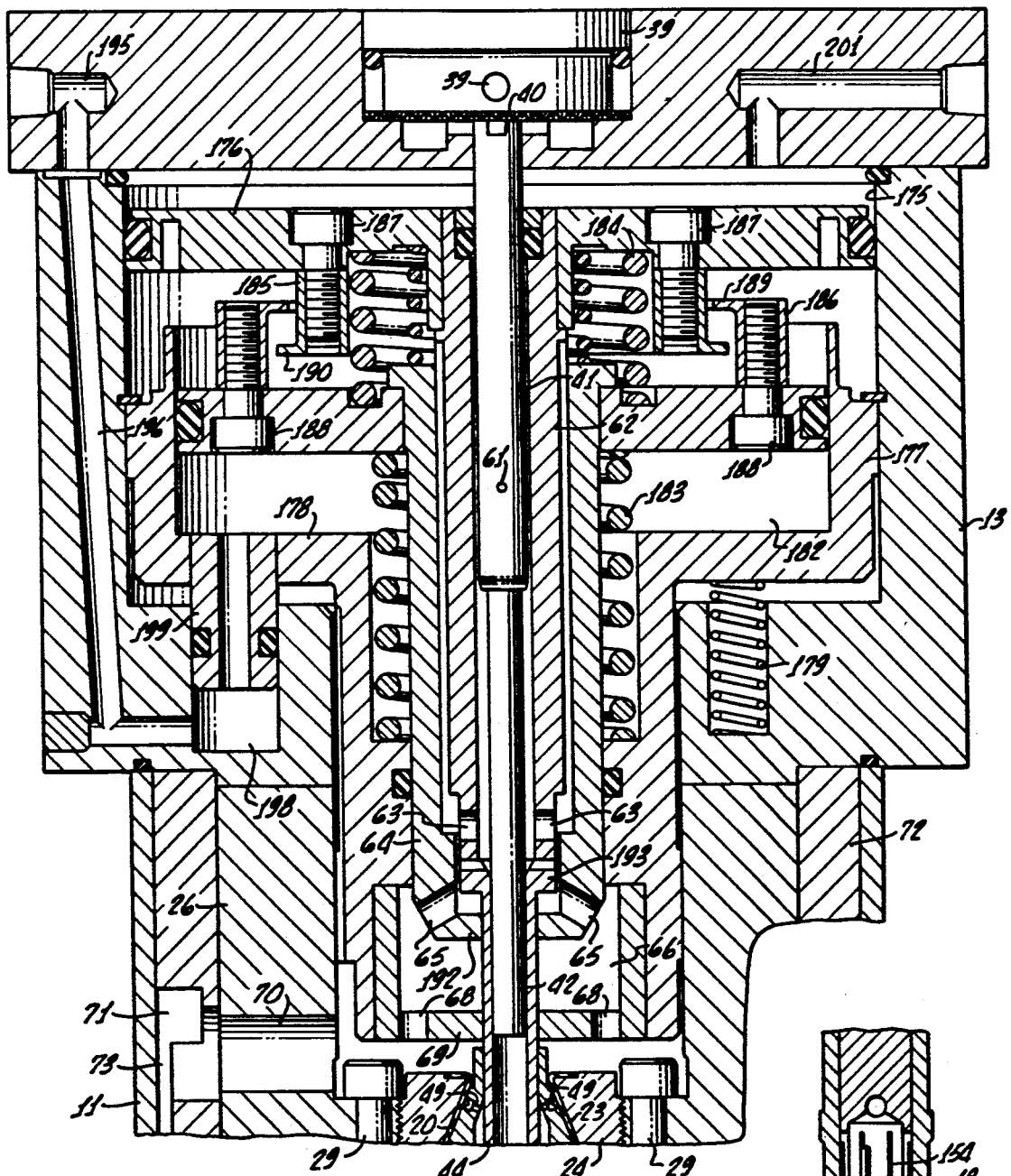
FIG. 15 is an enlarged longitudinal sectional view of the upper portion of the spindle with the collet actuating mechanism in the position for causing the collet to be opened.
Figure 13:
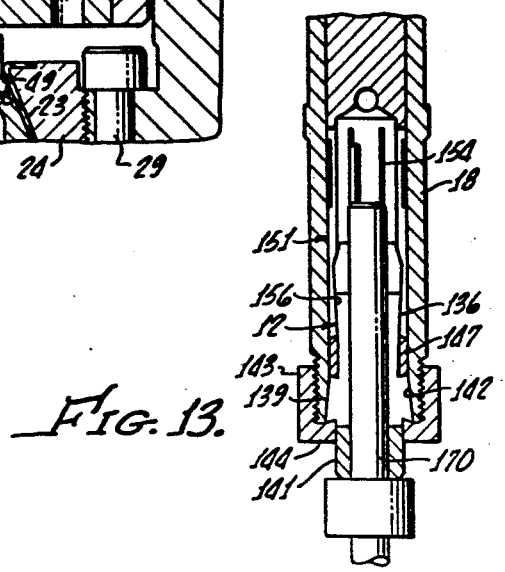
FIG. 13 is a fragmentary longitudinal sectional view of the collet assembly in the open position.

Release of the collet, as shown in FIG. 15, is accomplished by introducing pressurized water through a fitting 200 and a passageway 201 to the upper side of the piston 176. This forces the piston 176 downwardly, moving with it the sleeve 62. The lower end of the sleeve 62 then is brought to bear against the upper end flange 193 of the drawbar 44, pressing downwardly on the drawbar This forces the wedge 151 downwardly to release the collet, as described above. The shaft 18 is moved axially by the force exerted by the piston 176 to bring the flange 108 of the sleeve 106 at the lower end of the shaft into engagement with the member 101. The fluid pressure in the passageway 201 then is released so that the spring 184 pushes the piston back against the end cap 36 and the actuating mechanism returns to its neutral position where it is ready to again close the collet 12.

Figure 16:
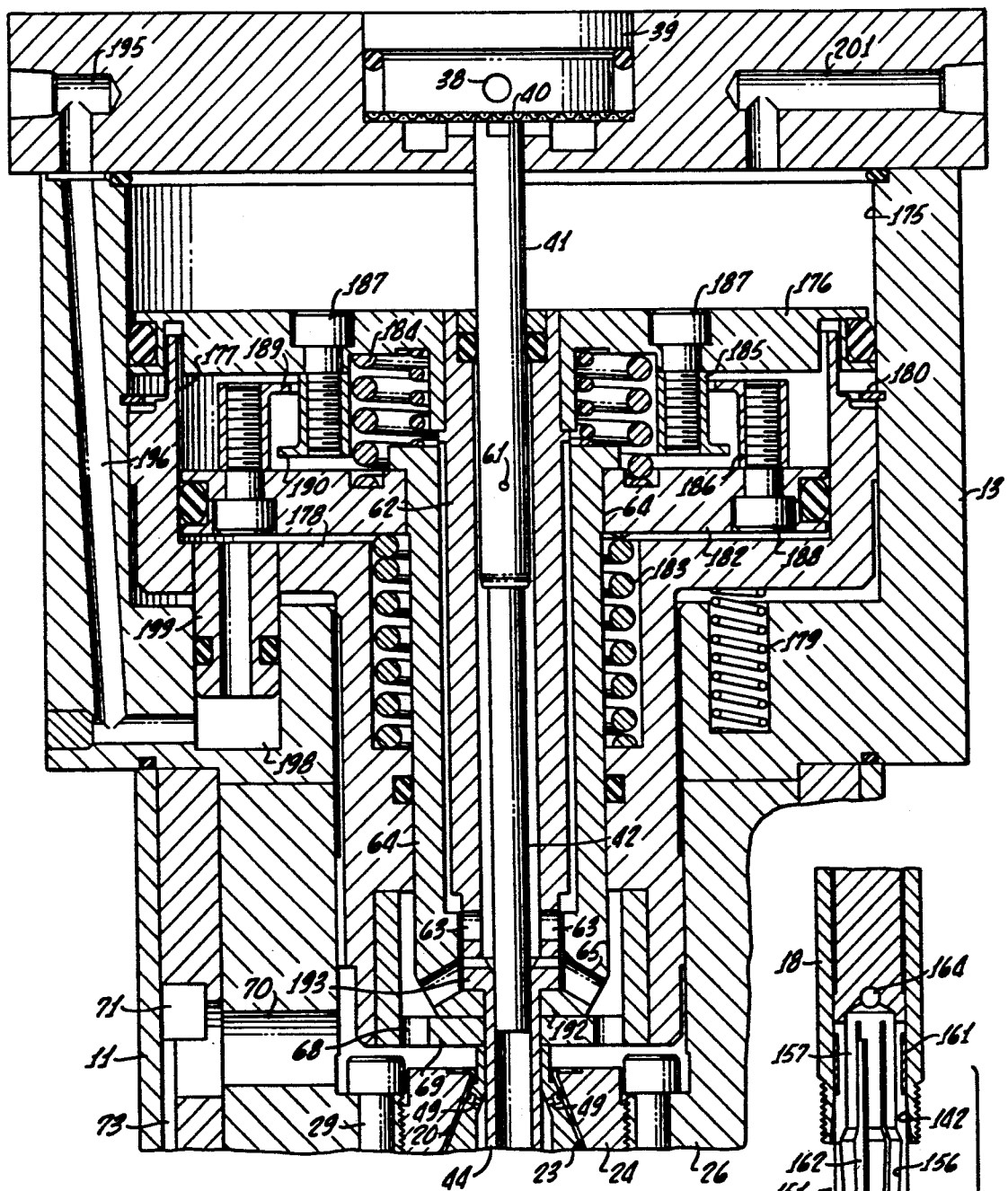
FIG. 16 is a view similar to FIG. 15 but with the collet actuating mechanism in the position for extending the collet assembly to the position of FIG. 14.
Figure 14:
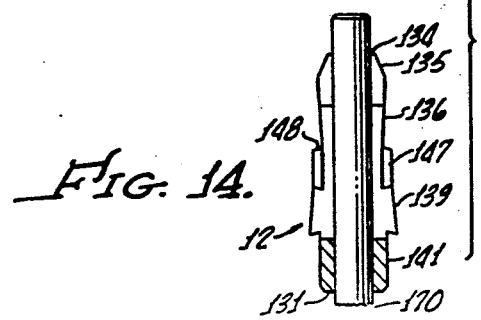
FIG. 14 is a fragmentary longitudinal sectional view of the collet assembly in the extended position with the collet removed for extraction of a broken tool from the collet.

In the event that a drill bit should break off flush with the bottom end of the collet 12, it may be extracted by first removing the nut 143 from the bottom end of the shaft member 18, thereby removing the stop for the collet 12. Pressure above the piston 176 then can move this piston further than before because the drawbar is free to move downwardly without restraint at the collet. The piston 182 and cylinder 177 also are moved downwardly as this occurs (see FIG. 16). The stroke of the piston 176, through the sleeve 62 and drawbar 44, results in similar movement of the wedge 151 and collet 12. In this manner, the collet 12 may be extended beyond the shaft 18 a distance sufficient to permit it to be grasped and removed from the wedge 151 and the shaft 18, as seen in FIG. 14. The broken drill shank then may be extracted and the collet 12 returned to the shaft and wedge.

Although bearing clearance remains substantially at 0.0001 inch from start up to operating speed, one of the bearings, in this instance the lower bearing 22, must be mounted for a small amount of axial motion relative to the rotor. This makes it possible to accommodate minute changes in clearance that otherwise would result from dimensional changes of the parts. In particular, variations in rotor temperature and environmental temperature will change bearing clearance, as will absorption of water by the bearing surfaces and bearing wear. For these reasons, the lower bearing 22 is movably mounted for motion toward and away from the journal 19, as previously described. Of course, the rotor becomes centered between the two bearings 22 and 23, so that movement of the lower bearing 22 will result in a corresponding adjustment for the upper bearing. Inasmuch as the bearing 22 is movable, the end load exerted upon it must be increased as rotor speed increases Although the water supply pressure remains constant, centrifugal force drives the water through the orifices 49 and 54 of the journals with a force that increases as speed becomes greater. Therefore, it is necessary to increase the bearing end loading with speed in order to resist the force of the water and maintain a substantially constant clearance at the bearings 22 and 23. Accordingly, it is important that a programmed increase in bearing stiffness be accomplished as the rotor starts and increases its rotational speed to its operating speed.

It has been determined that a sufficiently low bearing stiffness may be obtained by a pressure of about 6 psi in the bladder 114 prior to and during start-up of the rotor. It has also been determined that the bearing stiffness obtained by application of a bladder pressure of about 14 psi is suitable at about 14,000 rpm, which is at or near the lower limit of speed at which the spindle is used.

Knowing the rate of change of rotor speed as the rotor speed increases from zero to as much as 120,000 rpm, a programmed end load may be applied to the bearing 22 to increase bearing stiffness This end load may be made to vary through a predetermined force program so as to provide appropriate increase of bearing stiffness as rotor speed increases. However, instead of using a preprogrammed variation of bearing stiffness, it is preferred, to employ a closed loop stiffness control system. In such a closed loop system, rotor speed is sensed and used as a force command that is compared with the force applied to the bearing to generate an error signal. This signal is used to vary the applied force, and, therefore, to control stiffness according to the rotor speed. The closed loop arrangement is more readily able to follow variations in rate of change of rotor speed, and is thus preferred.

Figure 17:
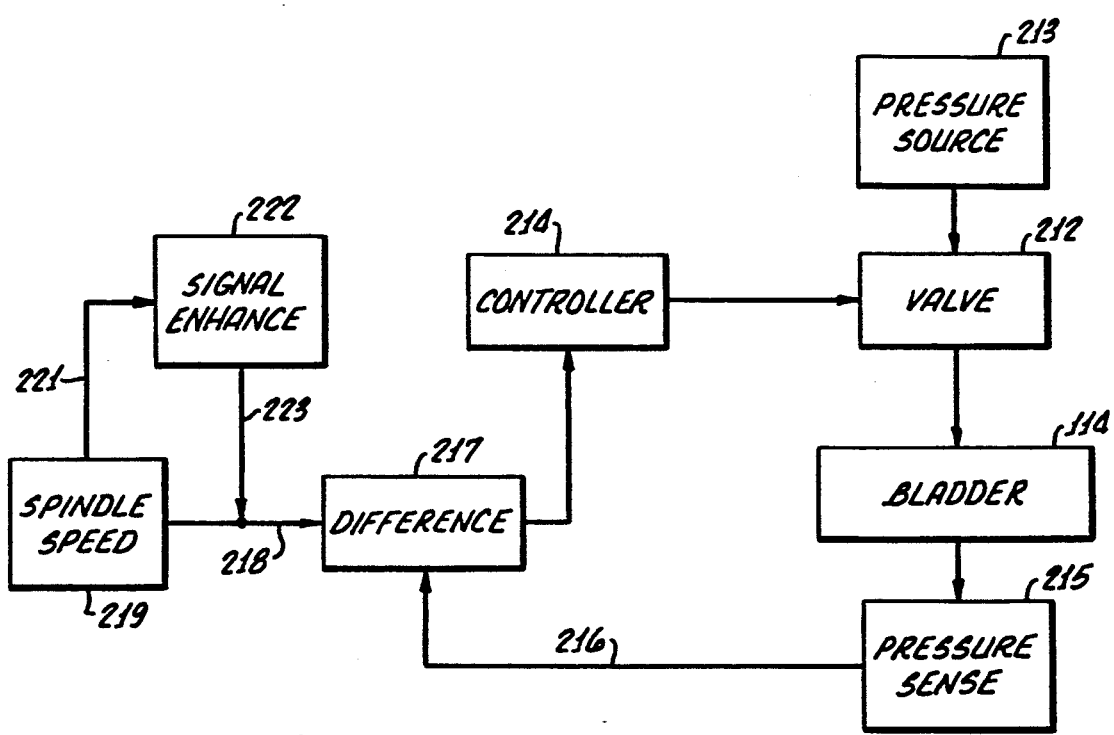
FIG. 17 is a schematic diagram of the system for controlling the end load on the bearings.

Illustrated in FIG. 17 is a simplified, functional block diagram of a closed loop stiffness control system employed with the spindle 10. The bearing drive bladder 114 receives air under pressure via a solenoid operated valve 212 from a pressure source 213. The valve is opened to an amount determined by a valve controller 214, which thus controls the pressure applied to the bladder 114 and concomitantly controls the force applied by the bladder to the bearing 22. Pressure within the bladder 114, which is proportional to the axial load applied by the bladder to the bearing 22, is detected by a pressure sensor 215 and fed as an electrical signal via a lead 216 as one input to a comparator or difference circuit 217. The latter receives as its second input a signal on a line 218 from the output of a rotor speed signal generating circuit 219. The difference circuit 217 compares the sensed pressure with the rotor speed and sends an error signal to operate the valve controller 214 so that the controller will open the valve 212 to an amount that is determined by the difference between the speed signal on line 218 and the pressure signal on line 216. If the pressure is too low, for example, the controller increases the amount by which the valve 212 is opened so that an increased pressure is applied to the bladder 114.

In a selected intermediate range of speeds of the rotor, as for example in a range of about 9,000 rpm to 14,000 rpm, the bearing stiffness is increased at a greater rate. This increased rate of stiffness change at intermediate speeds is desirable because of the need to avoid excessive stiffness at lower rotor speeds while ensuring that stiffness increases at a rate sufficient to obtain the stiffness afforded by bladder pressure of 14 psi at the lowest of the usual operating speeds (e.g., about 14,000 rpm). Thus, a speed signal from the circuit 219 is also fed via a line 221 to a signal enhancing circuit 222, which sends an enhanced speed signal via a line 223 to the difference circuit input that receives the speed signal on line 218. The signal enhancing circuit 222 is arranged to be effective only within a selected speed range.

Figure 18:
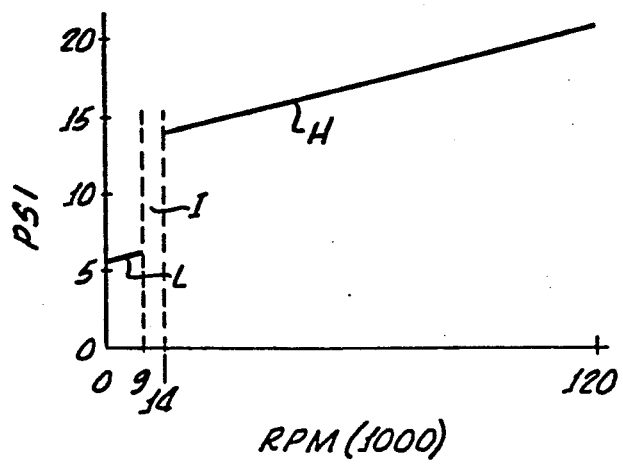
FIG. 18 is a graph showing the pressure in the bearing end loading bladder at different rotational speeds.

Illustrated in FIG. 18 is a graph of a presently preferred relation of bladder pressure, shown vertically in pounds per square inch (psi), and rotor speed, shown horizontally in thousands of revolutions per minute (rpm). It has been empirically determined that a bladder pressure of about 6 psi provides a desired bearing stiffness at the time the rotor is started. Thus, as shown in the graph of FIG. 18, at 0 rpm, before rotation is started, pressure within the bladder is maintained at approximately 6 psi. As the rotor is started and its speed increases, the closed loop circuit causes an increase in pressure within the bladder 114, and thus an increase in stiffness, as shown by the portion of the curve of FIG. 18 designated L Within the rotor speed range of 9,000 to 14,000 rpm, the signal enhancing circuit 222 is effective and results in a greater rate of pressure increase with rotor speed, and thus a greater rate of stiffness increase, as shown by the portion of the curve designated I. The enhancing circuit 222 is no longer effective after about 14,000 rpm, and thus the rate of increase of pressure is diminished in the speed range above about 14,000 rpm, as indicated by the portion of the curve designated H in FIG. 18.

Figure 19:
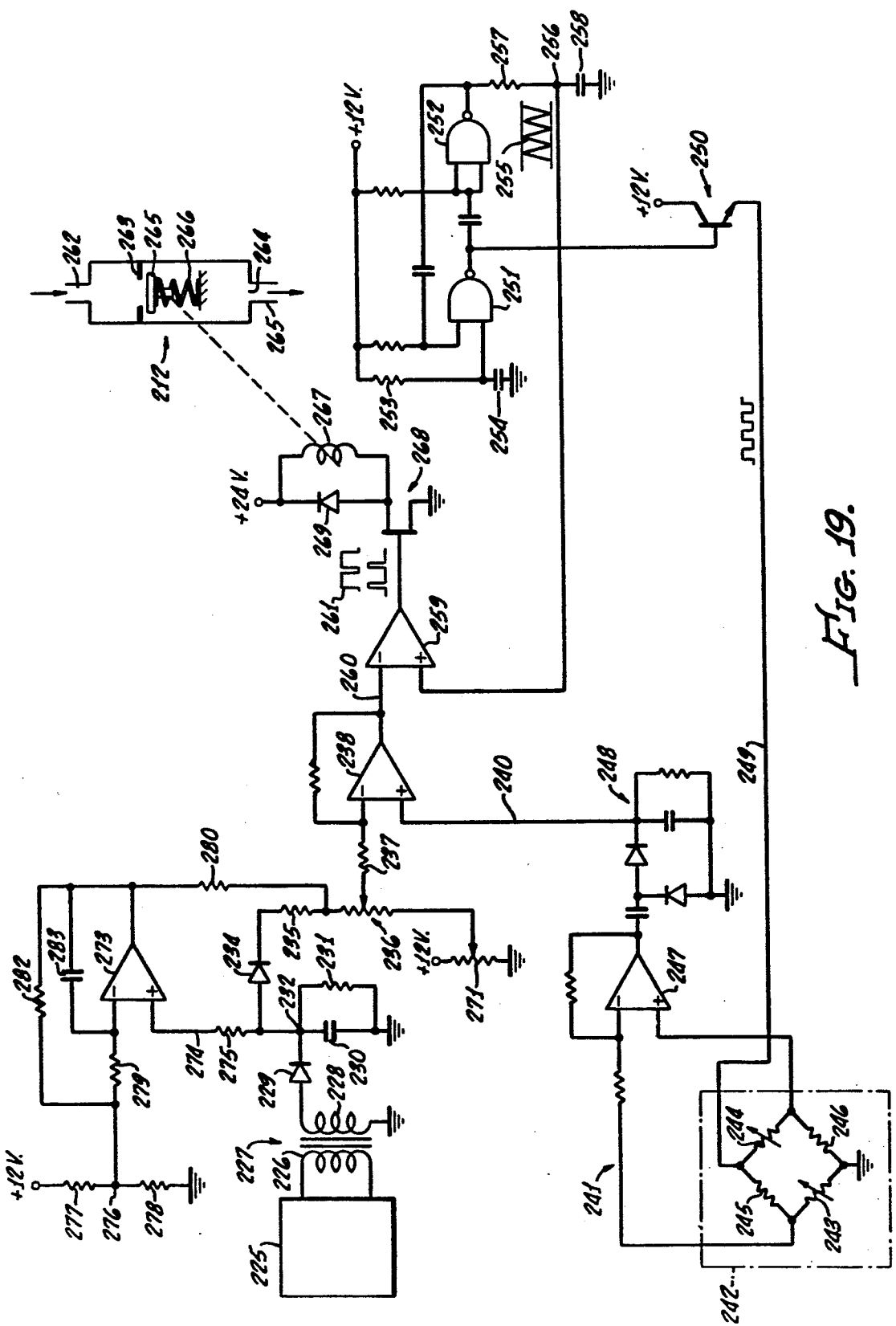
FIG. 19 is a diagram of the circuit of the bearing end load control system.

FIG. 19 shows a detailed circuit of the bearing end load control system of FIG. 17. A conventional frequency converter 225 drives the rotor and provides, a frequency that varies between 0 and 2,000 hertz, at the latter of which frequencies the rotor is turning at 120,000 rpm. Moreover, the peak-to-peak voltage of the frequency converter rises substantially linearly with frequency in order to accommodate changes in coil impedance as the speed changes Thus, a measure of the voltage of the frequency converter provides an indication of rotational speed of the rotor.

A primary coil 226 of a step-down transformer 227 is connected to two output leads of the frequency converter 225 to detect converter voltage A secondary coil 228 of the transformer 227 is connected via a diode 229 to a filter circuit comprising a capacitor 230 and resistor 231, which are connected in parallel to ground, as is the other side of secondary coil 228. Thus, an output voltage from the frequency converter is coupled by the transformer 227 to a point 232 on one side of the capacitor 230 to provide a DC voltage approximately proportional to the speed of the rotor. This voltage is fed via an isolation diode 234 and a resistor 235 to a potentiometer 236, having its wiper arm connected via a resistor 237 to the inverting input of an operational (or differential) amplifier 238 (equivalent to difference circuit 217 of FIG. 17).

A second input to amplifier 238, which is connected to its non inverting input, is provided on a line 240 from the output of a pressure sensing circuit generally indicated at 241.

The pressure sensing circuit 241 includes a conventional pressure transducer, indicated by dotted box 242, having a diaphragm to which two strain gauge type resistors are attached. As pressure on the diaphragm increases, the diaphragm and resistors bend, thereby changing resistance of the resistors linearly with pressure. In a presently preferred embodiment, the pressure transducer is connected by conventional means (not shown) to sense pressure at the output of the valve 212, which is substantially the same as pressure within the bladder 114. The variable resistors of the pressure transducer are indicated at 243,244, and, as shown in the drawing, are connected in a bridge circuit with fixed resistors 245,246 to provide an output across the bridge that is fed to the inverting and noninverting inputs of a differential amplifier 247. The output of amplifier 247 is fed via a rectifying and smoothing circuit 248, and via line 240 to the noninverting input of the amplifier 238, where the sensed pressure is compared with the speed signal.

Because the output of the bridge of the pressure transducer 242 is of a small value, in the order of millivolts, it is energized with a square wave so that its output can be more readily amplified without zero set drift problems.

The bridge circuit energizing square wave, having a frequency of about 500 hertz, is transmitted via a line 249 connected to the emitter of a bridge driving transistor 250. A pair of NAND gates 251,252 are connected in circuit as a free running multivibrator, oscillating at about 500 hertz. The multivibrator provides a 500 hertz square wave at the output of gate 251 that is fed to the base of transistor 250 for energizing the bridge circuit of the pressure transducer. A resistor 253 is connected in series with a capacitor 254 between a positive voltage, such as 12 volts, and ground, with the junction of the resistor and capacitor connected to one of the inputs of gate 251. This keeps the gate 251 turned off at start up until the full positive voltage is established and ensures that the multivibrator will start its oscillation.

A second output is provided from the multivibrator in the form of a saw tooth wave indicated at 255, varying at about between 2 and 10 volts. This saw tooth wave is provided at the output of NAND gate 252 of the multivibrator at a junction 256 between a resistor 257 and a capacitor 258 connected in series between the gate output and ground. The RC network connected to the output of the gate 252 changes the square wave output to the illustrated saw tooth. This saw tooth voltage is fed to the noninverting input of a differential amplifier 259 (equivalent to controller 214 of FIG. 17) that operates to control the valve 212.

An error signal output (e.g., the difference between the rotor speed signal and the sensed pressure signal) from the differential amplifier 238 is fed via a line 260 to the inverting input of the differential amplifier 259, which operates to combine its two inputs to provide a square wave output 261 of variable pulse width The arrangement of the differential amplifier 259, having a saw tooth provided at one of its inputs and the error signal at its other, provides an output of variable pulse width and therefore of variable power for driving the solenoid of valve 212.

The valve 212, schematically illustrated in FIG. 19, receives air under pressure at an input port 262, from which air is fed through an aperture in a valve seat 263 and through the body of the valve, to exit from an output port 264. Air under controlled pressure is conducted from the valve via a conduit 265 to the air inlet fitting 76 and hence to the interior of the bladder 114. The valve is provided with a closure member 265 which is urged by a compression spring 266 to closed position. A solenoid coil 267 is mounted to the valve body and arranged to drive the valve away from its seat and against the closing action of the spring 266, when the solenoid coil is energized. The solenoid is energized from the pulse width modulated output of differential amplifier 259 via a power F.E.T. 268, having its source electrode connected to a voltage source, such as 24 volts, through coil 267 of the solenoid A voltage limiting diode 269 is connected in parallel with the coil 267. The base electrode of the F.E.T. is connected to the output of valve controlling amplifier 259 while its drain electrode is connected to ground.

Prior to starting the rotor, the closed loop system is set to provide a pressure within the bladder 114 of about 6 psi, as mentioned above. This is set by adjusting a potentiometer 271, having its wiper arm connected via potentiometer 236 and resistor 237 to the inverting input of the amplifier 238. Diode 234 isolates the inverting input of the amplifier 238 so that this input is approximately set by the potentiometer 271. If the actual air pressure within the bladder 114, as sensed by the pressure transducer 242 at this time, is much lower than the desired value, the voltage at the noninverting input of the amplifier 238 is much lower than the voltage (e.g., the rotor speed signal) at its inverting input. This causes the inverting input of the valve controlling amplifier 259 to be zero and to remain lower than its noninverting input. Thus, the inverting input of the amplifier 259 is always lower than the lowest points of the saw tooth wave 255. Therefore, the output of the amplifier 259 is high, and the power F.E.T. 268 will be in full conduction to energize the solenoid coil 267, which opens the valve 212 to raise air pressure within the bladder 114.

As the air pressure rises, the two inputs of the amplifier 238 become more nearly matched and its error output assumes an intermediate point between about 2 and 10 volts (the upper and lower limits of the saw tooth 255 that is fed to the noninverting input of the amplifier 259). The output of the amplifier 238 is effectively mixed in the amplifier 259 with the saw tooth voltage present at its noninverting input. This provides a pulse width modulated driving signal to the solenoid coil 267 and provides just enough average power to the coil to hold the valve output to the selected six pounds per square inch. Basically, the closed loop system operates to vary the valve opening, and thus vary the pressure within the bladder 114, in a sense and by an amount that tends to maintain the two inputs to the differential amplifier 238 at substantially equal values.

The valve spring 266 is adjustable so as to properly react against the varying opening pressure of the solenoid, as the latter varies with modulation of the width of its driving pulses. Input pressure to the valve 212 urges the closure member 265 toward the open position against the action of the adjustable spring 266. Increasing energy to the solenoid coil 267, together with the input pressure, moves the valve closure 265 toward the open position, resulting in greater flow and therefore increasing output air pressure.

When rotation is started, rotor speed voltage at point 232 on capacitor 233 increases rapidly and thereby increases the voltage at the inverting input of the amplifier 238. This causes a reduction in the voltage at the output of the amplifier 238, and thus a reduction of the voltage at the inverting input of valve controlling amplifier 259. The decrease in voltage at its inverting input causes the on time of the square wave output of amplifier 259 to increase (pulse width is increased) to increase the input power to the solenoid. Thereupon air pressure increases until the noninverting input of the amplifier 238 becomes equal to its inverting input.

Speed signal enhancement for an intermediate range of rotor speeds is provided by a differential amplifier 273 (equivalent to the signal enhancing circuit 222 of FIG. 17), having a signal fed to its noninverting input on a line 274 via a resistor 275 that is connected to the point 232 at which the speed signal from the frequency converter 225 appears. The inverting input of the amplifier 273 is connected to the junction 276 of a voltage divider comprising resistors 277,278 coupled between a 12 volt potential and ground. A capacitative and resistive feedback is provided from the amplifier output to opposite sides of an input resistor 279 connected to its inverting input. Output of the speed signal enhancing amplifier 273 is fed via a resistor 280 and thence via resistor 237 and potentiometer 236 to the inverting input of the amplifier 238. Thus, the output of the amplifier 273 is effectively combined with the primary speed signal fed from point 232 via resistor 235. Effectively, the combined speed signal at the inverting input to the amplifier 238 increases at one rate in the speed range below about 9,000 rpm and at a higher rate in the speed range between about 9,000 and 14,000 rpm, returning to the first rate at speeds above 14,000 rpm.

The amplifier 273 is effective only within a selected speed range to enhance the speed signal fed to the inverting input of amplifier 238. Until the speed signal reaches a first predetermined value, the signal fed to the noninverting input of the amplifier 273 is low. Therefore, this amplifier does not cause any increase of the speed signal at the inverting input of comparator amplifier 238 at low speeds Further, when the primary speed signal at point 232 goes above a second predetermined value, amplifier 273 saturates and can increase its output no further.

In operation of the speed signal enhancing amplifier 273, when rotor speed is below about 9,000 rpm, the speed signal at its noninverting input is considerably lower than the fixed signal (from resistors 277,278) at its inverting input, and accordingly its output is low. Pressure within the bladder increases at a relatively slow rate, as indicated by portion L of the curve of FIG. 18. When speed reaches about 9,000 rpm, the noninverting input of the amplifier 273 becomes substantially equal to the inverting input of this amplifier (set by the fixed voltage divider 277,278), and starts to rise above the fixed input. Output of amplifier 273 then rises, and provides an increased voltage via the driver system of resistor 280 and resistor 235 to enhance the speed signal fed from point 232 to the error amplifier 238. This causes the rate of air pressure increase in the bladder 114 to increase, as indicated by the portion I of the curve of FIG. 18 between 9,000 and 14,000 rpm.

When the rotation speed reaches a value of about 14,000 rpm, amplifier 273 is saturated, and its output can no longer increase. Therefore, at a speed of about 14,000 rpm and above, the rate of increase of air pressure returns to the lower rate that occurred at speeds below 9,000 rpm, as indicated by portion H of the curve of FIG. 19.

Relative values of the resistors 277 and 278 of the voltage divider, together with the feedback resistor 282 connected to the output of amplifier 273, and amplifier input resistor 279 collectively determine the point at which the amplifier 27 saturates. In an exemplary system, the relative values of these resistors are as follows: resistor 277 is 470 k ohms, resistor 278 is 100 k ohms, feedback resistor 282 is 1 megohm and input resistor 279 is 3.3 megohms.

Input resistor 279 and a feedback capacitor 283 connected between the output and input of amplifier 273 operate to provide a response delay that prevents sudden pressure drop if the frequency converter is suddenly shut off and the speed signal input to the noninverting input of the amplifier 273 drops sharply. Proper bearing stiffness is still required for an interval after the rotor drive stops because the rotor will continue to rotate under its own momentum. Potentiometer 236 at the input to comparator amplifier 238 is adjusted to set the air pressure value desired for the full speed of 120,000 rpm. Potentiometer 271 is adjusted to establish the desired low speed pressure. Although potentiometers 236 and 271 are affected by each other to some degree, they are adequately separated by the fact that the voltage at the cathode of diode 234 is about 30 volts at 120,000 rpm.

Thus, a closed loop control system is provided that automatically causes the bearing stiffness to increase as rotation speed increases, and, moreover, to increase at an increasing rate within a predetermined range of speeds, all arranged to provide relatively low bearing end load or stiffness required for friction free start up and to provide the increased end load and stiffness required at operating speeds.

The foregoing detailed description is to be clearly understood as given by way of illustration and example only, the spirit and scope of this invention being limited solely by the appended claims.

What is claimed is:

1. A spindle comprising
   a housing,
   a stator within said housing,
   a rotor rotatable within said stator,
   a collet rotatable by said rotor,
   a frustoconical journal at each end of said rotor, said journals tapering outwardly away from said rotor,
   a rubber bearing substantially complementarily receiving each of said journals, mounting means for each of said bearings for supporting the same, a source of water under pressure, and means for connecting said water to a location within said rotor, each of said journals having an opening therethrough for receiving said water and conducting the same to said bearings for lubricating said bearings.

2. A device as recited in claim 1 in which each of said openings is of predetermined dimension for metering the flow of said water to said bearings.

3. A device as recited in claim 1 in which each of said journals is provided with groove means therein extending away from said opening therethrough for distributing water received in said opening along the surface of the one of said bearings receiving said journal 4. A device as recited in claim 3 in which said rotor rotates in a predetermined direction, and said groove means extend from said openings in a direction opposite from said predetermined direction of rotation.

5. A device as recited in claim 4 in which each of said groove means defines a spiral.

6. A device as recited in claim 3 in which each of said groove means includes a groove that diminishes in cross section away from said opening 7. A device as recited in claim 4 in which each of said journals has a plurality of said openings, and said groove means include a groove extending away from each of said openings.

8. A device as recited in claim 7 in which each of said grooves has an end remote from the one of said openings from which it extends, each of said grooves decreasing in cross section progressively toward said end thereof.

9. A device as recited in claim 8 in which each of said grooves extends through an arc of approximately 180°.

10. A device as recited in claim 8 in which each of said journals is provided with four of said openings and four of said grooves.

11. A device as recited in claim 3 in which said journals and said bearings are positioned axially outwardly of said stator, and including a seal positioned between each of said bearings and said stator such that one side of each of said seals is adjacent one of said journals and the opposite side of each of said seals is adjacent said stator, a source of compressed air, and means for conducting said compressed air to said opposite sides of said seals for cooperating with said seals in preventing said water from flowing toward said stator.

12. A device as recited in claim 11 in which each of said seals is annular and of generally frustoconical configuration, with the apical end of each of said seals being adjacent one of said journals and remote from said stator 13. A device as recited in claim 12 in which each of said seals tapers in thickness toward said apical end thereof.

14. A spindle comprising
housing means,
an electric motor in said housing means,
said electric motor including a stator and a rotor,
a collet connected to and rotated by said rotor,
said rotor including hollow shaft means and a passageway extending through said hollow shaft means, and
means for conducting a liquid through said passageway for removing heat from said rotor.

15. A device as recited in claim 14 in which said collet is received in said hollow shaft means and is in spaced adjacency with said passageway, whereby heat is removed from said collet and from a tool carried by said collet.

16. A spindle comprising
housing means,
an electric motor in said housing means,
said electric motor including a stator and a rotor,
a collet connected to and rotated by said rotor,
said rotor including a member having a tubular end portion defining a passageway therethrough, and
means for conducting a liquid through said passageway for removing heat from said rotor,
said means for conducting liquid through said passageway including a source of liquid, and a non-rotatable plastic tube connected to said source of liquid and received in said tubular end portion of said member for discharging liquid into said member.

17. A device as recited in claim 16 including means movable axially relative to said rotor for actuating said collet, said member having a tubular end portion being part of said means for actuating said collet.

18. A spindle comprising
housing means,
an electric motor in said housing means,
said electric motor including a stator and an armature rotatable within said stator,
shaft means extending through and connected to said armature,
said shaft means having opposite outer ends spaced beyond the opposite ends of said armature and said stator,
a duality of bearings,
one of said bearings being positioned adjacent either outer end of said shaft means for rotatably mounting said shaft means,
means for conducting water to said bearings for lubrication thereof,
a seal between each of said bearings and said armature,
each of said seals circumscribing said shaft means and having an inner edge adjacent thereto, and
means for conducting air under pressure between each of said seals and said armature for preventing water exhausting from the adjacent one of said bearings from leaking past said seal and reaching said electric motor.

19. A device as recited in claim 18 in which each of said seals is frustoconical and inclined away from said armature toward the adjacent one of said bearings.

20. A device as recited in claim 19 in which each of said seals tapers in thickness from a radially outer portion to the inner edge thereof 21. A device as recited in claim 18 in which said seals are made of silicone rubber.

22. A device as recited in claim 18 in which said shaft means includes a passageway therethrough forming a part of said means for conducting water to said bearings, said passageway including metering orifices extending through said shaft means in the vicinity of said bearings.

23. A device as recited in claim 18 in which each of said outer ends of said shaft includes a frustoconical portion forming a journal, said bearings being frustoconical and receiving said journals, and including movable means for mounting one of said bearings for permitting movement of said one bearing toward and away from the one of said journals received therein for varying the end load on said one bearing, and means for biasing said one bearing toward said one of said journals for providing a predetermined end load on said one bearing.

24. A device as recited in claim 23 in which said means for biasing said one bearing is pneumatically operable, and the source of air under pressure is connected to said means for biasing said one bearing 25. A device as recited in claim 18 including, in addition, means in said housing means defining a passageway around the exterior of said stator, and means for conducting a portion of said water to said passageway around said stator for cooling said stator.

26. A device as recited in claim 25 in which each of said bearings has an end remote from said armature, and including means for connecting the zone at said end of one of said bearings to said passageway around said stator, whereby water exhausting from said one of said bearings provides cooling water for said stator.

27. A device as recited in claim 26 in which said one of said bearings is remote from said collet and the other of said bearings is adjacent said collet.

28. A device as recited in claim 18 in which said shaft means extends through one end of said housing means, and including a seal circumscribing said shaft means adjacent said one end of said housing means.

29. A device as recited in claim 28 in which said last mentioned seal includes a duality of seal members, one of said duality of seal members including a portion inclined inwardly relative to said housing and the other of said seal members including a portion inclined outwardly relative to said housing, the ends of said portions of said seal members being adjacent said shaft means, said source of air under pressure being in communication with the zone intermediate said portions of said seal members for precluding the flow of water outwardly beyond said one of said duality of seal members and precluding the entry of foreign material into said housing means from beyond the other of said duality of seal members.

30. A device as recited in claim 29 in which each of said duality of seal members includes an annular flat portion connected to and radially outwardly of said inclined portion thereof, said flat portions being in interengagement, and including groove means for conducting the air under pressure to said zone intermediate said portions of said seal members.

31. A method of operating a rotor comprising the steps of
provinding a journal on a rotor,
positioning said journal in a bearing,
rotating said rotor at a variable speed, and to decrease the difference between said speed signal and said stiffness signal.

32. The method as recited in claim 31 wherein said step of varying said force comprises the steps of employing a pneumatic driving device for exerting a pressure that varies said force, sensing said pressure, and controlling said pneumatic driving device in accordance with said sensed pressure and rotor speed.

33. The method as recited in claim 32 wherein said step of controlling said pneumatic driving device comprises changing pressure exerted by the device at different rates in different ranges of rotor speed.

34. A method of operating a rotor at a high rate of rotation comprising the steps of
providing a journal on a rotor,
positioning said journal in a bearing that is movable toward and away from the rotor to vary the stiffness of said bearing,
rotating the rotor,
generating a speed signal representative of speed or rotation of the rotor,
exerting a force on the bearing to urge the bearing toward the rotor,
generating a force signal representative of said force exerted on the bearing, comparing said speed and force signals, and varying said force exerted on the bearing in a sense to decrease the difference between said speed and force signals 35. The method as recited in claim 34 including the step of generating a second speed signal representative of rotor speed in a predetermined range of rotor speeds, said step of comparing comprising comparing said force signal with both of said speed signals 36. The method as recited in claim 34 wherein said step of exerting a force comprises the steps of employing a bladder to urge the bearing toward the rotor, and providing a pressure within said bladder, said step of generating a force signal comprising sensing pressure within said bladder, said step of varying said force comprising controlling pressure within said bladder in accordance with sensed pressure and rotor speed.

37. Rotor bearing control apparatus comprising
a rotor,
said rotor having a journal,
a bearing receiving said journal and supporting said rotor for rotational movement,
means for mounting said bearing so as to permit movement thereof toward and away form said journal,
a driver for rotating said rotor at a variable speed, and means for biasing said bearing toward said journal with a force that increases as the rotational speed of said rotor increases,
said means for urging said bearing toward said rotor comprising a pressure operable device adjacent said bearing for urging the bearing toward the rotor in response to pressure applied to said device, and means for increasing pressure applied to said device as rotor speed increases,
said means for increasing pressure comprising command means for generating a speed signal indicative of rotor speed, feedback means for generating a pressure signal indicative of pressure applied to said device, comparator means for generating an error signal indicative of relative magnitudes of said pressure signal and speed signal, and control means responsive to said error signal for varying said pressure applied to said device in a sense to decrease said error signal.

38. The apparatus of claim 37 including means for generating a second speed signal indicative of rotor speed in an intermediate range of speeds, said error signal being indicative of magnitude of said pressure signal relative to a combination of both said speed signals.

39. Apparatus for controlling stiffness of a bearing rotatably supporting a rotor having a journal comprising
means for mounting said bearing for motion relative to said journal, bearing drive means for applying a force to the bearing tending to drive the bearing toward said journal and increase bearing stiffness, means for generating a speed signal indicative of rotor speed, means for generating a feedback signal indicative of said force applied to the bearing, and means for controlling said bearing drive means to vary the force applied to said bearing in accordance with the difference between said speed and feedback signals.

40. The apparatus of claim 39 wherein said means for generating a speed signal comprises means for causing said speed signal to increase at a first rate within a first range of rotor speeds and at a second rate within a second range of rotor speeds.

41. The apparatus of claim 39 wherein said bearing drive means comprises a fluid pressure actuated device having a driving connection with said bearing.

42. A rotor system having a variable stiffness bearing comprising a rotor having a journal, a bearing, means for supporting said bearing with freedom for motion toward and away from said journal to vary bearing stiffness, means for providing a primary speed signal indicative of rotor rotational speed, a bladder in driving relation to the bearing, a pressure source for providing pressurized gas, a conduit connecting the pressure source with the interior of the bladder, a valve interposed in the conduit for controlling the pressure of gas supplied to the bladder, a transducer in communication with the interior of the bladder to generate a pressure signal indicative of pressure in the bladder, a speed comparator having said pressure and primary speed signals applied as inputs thereto and having an error output indicative of sense and magnitude of the difference between said pressure and primary speed signals, and control means responsive to said error output for controlling said valve to thereby control the pressure of gas applied to said bladder.

43. The system of claim 42 including means for generating a reference signal, a second comparator having said reference signal and said primary speed signal as inputs thereto, and having an intermediate speed signal output, and means for feeding said intermediate speed signal output to the input of said speed comparator to which said primary speed signal is applied.

44. The system of claim 42 wherein said valve includes a movable valve closure member, and a spring for urging said closure member to closed position, a solenoid connected to move the closure member from said closed position to open the valve, said control means comprising a valve control differential amplifier having first and second inputs, said first input being connected to the output of said speed comparator, and an alternating wave generator having an output connected to the second input of said valve control amplifier.

45. The method of operating a rotor comprising the steps of providing a duality of tapered journals on a rotor, mounting said journals in a duality of tapered bearings, rotating said rotor in said bearings at a variable speed, introducing a fluid between said rotor and said bearings for lubricating said bearings while said rotor is so rotated, which fluid exerts a force on said bearings increasing with rotational speed urging said bearings away from said journals, applying a force against one of said bearings while said rotor is so rotating which opposes said force exerted by said fluid, sensing said rotor speed, sensing said applied force and varying said force exerted against said one bearing in accordance with said sensed speed and force so as to increase said force with an increase in rotational speed of said rotor.

46. A spindle comprising a housing, a stator in said housing, a rotor in said housing, said rotor including a frustoconical journal adjacent either each end of said rotor, a frustoconical bearing receiving each of said journals, a collet rotatable by said rotor, means for conducting water to said bearings for lubricating the same, mounting means for said bearings for supporting the same in said housing, said mounting means for one of said bearings including a support member carrying said one bearing, means for permitting movement of said support member such as to cause said one bearing to move toward and away from the one of said journals it receives, and means for biasing said support member so as to cause said one bearing to be pressed toward said one journal with a force that varies with the rotational speed of said rotor, said means for permitting movement of said support member including an additional bearing receiving said support member and providing for linear movement thereof.

47. A device as recited in claim 46 in which said means for permitting movement of said support member includes a cylindrical surface on the exterior of said support member, means providing a cylindrical surface spaced outwardly of said cylindrical surface of said support member, and a plurality of balls between said cylindrical surfaces and cooperating therewith so as to provide linear bearing.

48. A device as recited in claim 46 in which said means for permitting movement of said support member includes a stationary element in said housing in spaced adjacency with said support member, and a plurality of balls between said element and said support member.

49. A spindle comprising housing means, an electric motor in said housing means, said electric motor including a stator and a rotor, a collet connected to and rotated by said rotor, said rotor including a passageway therethrough, and means for conducting a liquid through said passageway for removing heat from said rotor, said collet being in heat transfer relationship with said rotor, whereby the removal of heat from said rotor also causes heat to be removed form said collet and from a tool carried by said collet.

50. A spindle comprising housing means, an electric motor in said housing means, said electric motor including a stator and a rotor, bearing means in said housing means for supporting said rotor, a collet connected to and rotated by said rotor, said rotor including a passageway therethrough, and means for conducting a liquid through said passageway for removing heat from said rotor, means for conducting liquid from said passageway to said bearing means for lubricating the same.

a collet connected to and rotated by said rotor, said rotor including a member having a tubular end portion defining a passageway therethrough, and means for conducting a liquid through said passageway for removing heat from said rotor, said means for conducting liquid through said passageway including a source of liquid, and a nonrotatable plastic tube connected to said source of liquid and received in said tubular end portion of said member for discharging liquid into said member.

51. A spindle comprising housing means, an electric motor in said housing means, said electric motor including a stator and a rotor, a collet connected to and rotated by said rotor, said rotor including a passageway therethrough, and means for conducting a liquid through said passageway for removing heat from said rotor, means movable axially relative to said rotor for actuating said collet, and retention means for holding said collet to said rotor, said retention means being removable so that said means movable axially relative to said rotor can extend said collet for removal form said rotor, whereby the shank of a broken tool can be removed from said collet.

52. A method of operating a rotor comprising the steps of providing a journal on a rotor, positioning said journal in a bearing, rotating said rotor at a variable speed, and biasing said bearing toward said journal with a force which varies in accordance with variations in rotor speed by producing pressure within a bladder, causing said bladder to urge the bearing toward the journal, sensing pressure within the bladder, comparing the sensed pressure with rotor speed to derive a control signal, and varying pressure within the bladder in response to said control signal.

53. A method of operating a rotor comprising the steps of providing a journal on a rotor, positioning said journal in a bearing, rotating said rotor at a variable speed, and biasing said bearing toward said journal with a force which varies in accordance with variations in rotor speed by generating a speed signal representative of rotor speed, generating a stiffness signal indicative of the magnitude of said force, comparing said speed signal with said stiffness signal, and varying said force in a sense to decrease the difference between said speed signal and said stiffness signal.

* * * * *

UNITED STATES PATENT AND TRADEMARK OFFICE
CERTIFICATE OF CORRECTION

PATENT NO. : 5,145,298
DATED : September 8, 1992
INVENTOR(S) : William F. Marantette It is certified that error appears in the above-identified patent and that said Letters Patent is hereby corrected as shown below:

Claim 3 (column 19, line 16) please insert at the end of the sentence a period ---.---

Claim 6 (column 19, line 25) please insert at the end of the sentence a period ---.---

Claim 12 (column 19, line 55) please insert at the end of the sentence a period ---.---

Claim 20 (column 20, line 55) please insert at the end of the sentence a period ---.---

Claim 34 (column 22, line 6) please delete "or" and substitute therefor ---of---

Claim 35 (column 22, line 20, please insert at the end of the sentence a period ---.---

Claim 37 (column 22, line 35) please delete "form" and substitute therefor ---from---

Claim 46 (column 24, line 21) please delete "either"

Claim 50 (column 25, line 10) please delete "and"

Claim 51 (column 25, line 33) please delete "and"

UNITED STATES PATENT AND TRADEMARK OFFICE
CERTIFICATE OF CORRECTION

PATENT NO. : 5,145,298

DATED : September 8, 1992

INVENTOR(S) : William F. Marantette

It is certified that error appears in the above-indentified patent and that said Letters Patent is hereby corrected as shown below:

Claim 51 (column 26, line 6) please delete "form" and substitute therefor ---from---

Signed and Sealed this

Twenty-first Day of June, 1994

Attest:

BRUCE LEHMAN

Attesting Officer     Commissioner of Patents and Trademarks